(12) United States Patent
Ramsay et al.

(10) Patent No.: US 8,423,893 B2
(45) Date of Patent: Apr. 16, 2013

(54) USER INTERFACE FOR MANAGING THE OPERATION OF NETWORKED MEDIA PLAYBACK DEVICES

(75) Inventors: Max Gordon Ramsay, New South Wales (AU); Joe Taylor, New South Wales (AU); Vincenzo Giuliani, Burlingame, CA (US)

(73) Assignee: Altec Lansing Australia Pty Limited, Sydney (AU)

( * ) Notice: Subject to any disclaimer, the term of this patent is extended or adjusted under 35 U.S.C. 154(b) by 189 days.

(21) Appl. No.: 12/811,437

(22) PCT Filed: Jan. 7, 2009

(86) PCT No.: PCT/AU2009/000017
§ 371 (c)(1),
(2), (4) Date: Jul. 1, 2010

(87) PCT Pub. No.: WO2009/086599
PCT Pub. Date: Jul. 16, 2009

(65) Prior Publication Data
US 2010/0299639 A1 Nov. 25, 2010

(30) Foreign Application Priority Data
Jan. 7, 2008 (AU) .............................. 2008900060

(51) Int. Cl.
*G06F 3/00* (2006.01)
(52) U.S. Cl.
USPC ......................................... 715/716; 715/835
(58) Field of Classification Search ................... 715/835, 715/716
See application file for complete search history.

(56) References Cited

U.S. PATENT DOCUMENTS

| 5,182,552 | A | * | 1/1993 | Paynting ...................... 340/4.42 |
| 5,406,634 | A | * | 4/1995 | Anderson et al. ............... 381/82 |
| 5,475,835 | A | * | 12/1995 | Hickey .......................... 725/109 |
| 5,519,641 | A | * | 5/1996 | Beers et al. .................... 709/208 |
| 5,646,602 | A | * | 7/1997 | Gertz et al. ................... 340/4.41 |
| 5,687,334 | A | * | 11/1997 | Davis et al. ................... 715/764 |
| 5,793,366 | A | * | 8/1998 | Mano et al. ................... 715/839 |
| 5,818,948 | A | * | 10/1998 | Gulick .......................... 381/77 |
| 5,838,384 | A | * | 11/1998 | Schindler et al. ............. 348/563 |

(Continued)

FOREIGN PATENT DOCUMENTS

| WO | WO 00/28396 A2 | 5/2000 |
| WO | WO 2007069835 A1 * | 6/2007 |
| WO | WO 2007/140476 A2 | 12/2007 |

OTHER PUBLICATIONS

Frucci, "Avega Wi-Fi Speakers Spread the Music-Related Love All Over Your House", Gizmodo.com, Jan. 6, 2007.*

(Continued)

*Primary Examiner* — Stephen Hong
*Assistant Examiner* — Joseph R Burwell
(74) *Attorney, Agent, or Firm* — Tarolli, Sundheim, Covell & Tummino LLP

(57) ABSTRACT

Described herein are systems and methods for managing the operation of networked media playback devices. One embodiment includes Graphical User Interface for coordinating playback of media via one or more networked wireless speaker devices. In particular, a user is able to "drag and drop" audio tracks to icons that are respectively indicative of one or more networked wireless speaker devices, thereby to affect playback of those audio tracks via those speaker devices.

8 Claims, 20 Drawing Sheets

U.S. PATENT DOCUMENTS

| | | | | |
|---|---|---|---|---|
| 6,421,692 B1* | 7/2002 | Milne et al. | | 715/202 |
| 6,433,800 B1* | 8/2002 | Holtz | | 715/835 |
| 6,700,592 B1* | 3/2004 | Kou et al. | | 715/771 |
| 6,963,784 B1* | 11/2005 | Gibbs | | 700/94 |
| 7,136,709 B2* | 11/2006 | Arling et al. | | 700/65 |
| 7,234,115 B1* | 6/2007 | Sprauve et al. | | 715/746 |
| 7,571,014 B1* | 8/2009 | Lambourne et al. | | 700/94 |
| 7,574,723 B2* | 8/2009 | Putterman et al. | | 725/80 |
| 7,742,606 B2* | 6/2010 | Kreifeldt et al. | | 381/58 |
| 7,944,922 B2* | 5/2011 | Kinder et al. | | 370/392 |
| 7,983,615 B2* | 7/2011 | Bryce et al. | | 455/41.2 |
| 7,987,294 B2* | 7/2011 | Bryce et al. | | 709/248 |
| 8,028,038 B2* | 9/2011 | Weel | | 709/219 |
| 8,028,323 B2* | 9/2011 | Weel | | 725/141 |
| 8,086,575 B2* | 12/2011 | Putterman et al. | | 707/693 |
| 8,161,400 B2* | 4/2012 | Kwon | | 715/769 |
| 2002/0072816 A1* | 6/2002 | Shdema et al. | | 700/94 |
| 2003/0103088 A1* | 6/2003 | Dresti et al. | | 345/835 |
| 2004/0088731 A1* | 5/2004 | Putterman et al. | | 725/94 |
| 2004/0183756 A1* | 9/2004 | Freitas et al. | | 345/73 |
| 2005/0177256 A1* | 8/2005 | Shintani et al. | | 700/94 |
| 2006/0205349 A1* | 9/2006 | Passier et al. | | 455/41.2 |
| 2007/0147351 A1* | 6/2007 | Dietrich et al. | | 370/352 |
| 2007/0162872 A1* | 7/2007 | Hong et al. | | 715/828 |
| 2008/0126936 A1* | 5/2008 | Williams | | 715/717 |
| 2008/0256341 A1* | 10/2008 | Weisberg et al. | | 712/220 |
| 2009/0307658 A1* | 12/2009 | Freitas et al. | | 717/113 |
| 2010/0284389 A1* | 11/2010 | Ramsay et al. | | 370/338 |
| 2010/0292818 A1* | 11/2010 | Ramsay | | 700/94 |
| 2010/0293264 A1* | 11/2010 | Ramsay | | 709/223 |
| 2010/0318911 A1* | 12/2010 | Holladay et al. | | 715/716 |
| 2010/0318917 A1* | 12/2010 | Holladay et al. | | 715/735 |

OTHER PUBLICATIONS

"AMIMON WHDI Technology to Be Featured at CES in Forthcoming Belkin Wireless HD Solution", Webwire.com, Jan. 4, 2008.*

Falcone, "Neosonik home theater delivers wireless audio and video", CNET.com, Jan. 9, 2007.*

Leotta, "Harman Kardon DMC 1000 Digital Media Center", Audioholics.com, Sep. 7, 2007.*

International Search Report—3 pgs., Mar. 27, 2009, Avega Systems PTY Ltd.

* cited by examiner

USER INTERFACE FOR MANAGING THE OPERATION OF NETWORKED MEDIA PLAYBACK DEVICES

FIELD OF THE INVENTION

The present invention relates to systems and methods for managing the operation of networked media playback devices. Embodiments of the invention have been particularly developed to provide a graphical user interface (GUI) for managing the operation of a plurality of wireless speaker devices. While some embodiments will be described herein with particular reference to that application, it will be appreciated that the invention is not limited to such a field of use, and is applicable in broader contexts.

BACKGROUND

A networked media playback device (such as a networked speaker device) typically includes a central processing unit coupled to a memory unit, a networking interface and output hardware (such as an amplifier and one or more speaker cones in the case of a speaker). The central processing unit provides a media rendering functionality whereby data indicative of audio received via the networking interface is processed to provide a corresponding audible output via the audio output hardware. In the case of a wireless media playback device, the networking interface typically implements a wireless networking standard such as the IEEE 802.11 standard.

Wireless speaker subsystems are often used together as a wireless audio system. For example, a significant driving factor behind the development of wireless technology has been to allow a multi-speaker surround sound system to be installed without the need to run wires around a room. However, the configuration and control of a wireless audio system of this sort presents various challenges. Furthermore, these challenges become compounded in situations in situations where multiple wireless audio systems exist on a common network.

SUMMARY

One embodiment provides a method for managing the operation of networked media playback devices, the method including:
  (i) providing an interface for displaying a plurality of player icons that are each indicative of a respective one or more networked media playback devices;
  (ii) providing an interface for displaying a graphical representation of a media library having a plurality of items;
  (iii) allowing a user to graphically manipulate one or more items in the media library; and
  (iv) being responsive to graphical manipulation of one or more items in the media library to one of the player icons for providing an instruction to commence playback of the one or more items at the one or more networked media playback devices of which the player icon is indicative.

One embodiment provides a method wherein at least one of the playback icons is indicative of a single wireless speaker device.

One embodiment provides a method wherein at least one of the playback icons is indicative of a wireless speaker group including a plurality of wireless speaker devices.

One embodiment provides a method wherein at least one of the playback icons is indicative of a wireless speaker zone including a plurality of wireless speaker groups.

One embodiment provides a method wherein at least one of the playback icons is indicative of a wireless speaker zone including at least one wireless speaker group and at least one additional wireless speaker device.

One embodiment provides a method wherein providing an instruction to commence playback of the one or more items at the one or more networked media playback devices of which the player icon is indicative includes adding the one or more items to a "now playing" list for the one or more networked media playback devices.

One embodiment provides a method wherein the one or more networked media playback devices are represented by a single virtual device, and providing an instruction to commence playback of the one or more items at the one or more networked media playback devices of which the player icon is indicative includes adding the one or more items to a "now playing" list for that virtual device.

One embodiment provides a method including the steps of
  (v) allowing a user to graphically manipulate the player icons;
  (vi) being responsive to graphical manipulation of a first one or more of the player icons to a second one of the player icons for providing an instruction to define a networked media playback zone/group including:
    (a) the none or more networked media playback devices of which the first one or more of the player icons are indicative; and
    (b) the none or more networked media playback devices of which the second one of the player icons is indicative; and
  (vii) displaying in the interface a player icon indicative of the defined networked media playback zone/group.

One embodiment provides a method for managing the operation of networked media playback devices, the method including:
  (i) providing an interface for displaying a screen area indicative of a respective one or more networked media playback devices;
  (ii) providing an interface for displaying a graphical representation of a media library having a plurality of items;
  (iii) allowing a user to graphically manipulate one or more items in the media library; and
  (iv) being responsive to graphical manipulation of one or more items in the media library to the screen area for providing an instruction to commence playback at the one or more networked media playback devices of which the player icon is indicative.

One embodiment provides a method for managing the operation of networked media playback devices, the method including:
  (i) providing an interface for displaying a plurality of player icons that are indicative of a respective none or more networked media playback devices;
  (ii) allowing a user to graphically manipulate the player icons;
  (iii) being responsive to graphical manipulation of a first one or more of the player icons to a second one of the player icons for providing an instruction to define a networked media playback zone/group including:
    (a) the none or more networked media playback devices of which the first one or more of the player icons are indicative; and
    (b) the none or more networked media playback devices of which the second one of the player icons is indicative; and
  (iv) displaying in the interface a player icon indicative of the defined networked media playback zone/group.

One embodiment provides a method wherein the player icon displayed at step (iv) corresponds to the second one of the player icons.

One embodiment provides a method wherein the player icon displayed at step (iv) is a new player icon.

One embodiment provides a method including the steps of
(v) providing an interface for displaying a graphical representation of a media library having a plurality of items;
(vi) allowing a user to graphically manipulate one or more items in the media library; and
(vii) being responsive to graphical manipulation of one or more items in the media library to one of the player icons for providing an instruction to commence playback of the one or more items at the one or more networked media playback devices of which the player icon is indicative.

One embodiment provides a method for managing the operation of networked media playback devices, the method including:
(i) providing an interface for displaying a plurality of player icons that are indicative of a wireless speaker device, and a plurality of location icons that are respectively indicative of roles in a multi-speaker arrangement;
(ii) allowing a user to graphically manipulate the player icons;
(iii) being responsive to graphical manipulation of one of the player icons to one of the location icons for providing an instruction configure the speaker device of which that icon is indicative to adopt the role in a multi-speaker arrangement of which the location icon is indicative.

One embodiment provides a method wherein the multi-speaker arrangement is a surround sound arrangement.

One embodiment provides a method including the step of being responsive to a user command in respect of one of the player icons for instructing the speaker device of which that icon is indicative to playback an audible signal.

One embodiment provides a method for managing the operation of networked media playback devices, the method including:
(i) providing an interface for displaying a plurality of player icons that are indicative of a wireless speaker device, and a plurality of location icons that are respectively indicative of roles in a multi-speaker arrangement;
(ii) allowing a user to graphically manipulate the location icons;
(iii) being responsive to graphical manipulation of one of the location icons to one of the player icons for providing an instruction configure the speaker device of which that icon is indicative to adopt the role in a multi-speaker arrangement of which the location icon is indicative.

One embodiment provides a computer program product for performing a method according to any preceding claim.

One embodiment provides a computer-readable medium encoded with a set of instructions that when executed by one or more processors cause the one or more processors to carry out a method according to any preceding claim.

One embodiment provides a computer system including one or more processors configured to carry out a method according any preceding claim.

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Particular embodiments may provide all, some, or none of these aspects, features, or advantages. Particular embodiments may provide one or more other aspects, features, or advantages, one or more of which may be readily apparent to a person skilled in the art from the drawings, descriptions, and claims herein.

DETAILED DESCRIPTION OF EMBODIMENTS

Described herein are systems and methods for managing the operation of networked media playback devices. One embodiment includes a Graphical User Interface for coordinating playback of media via one or more networked wireless speaker devices. In particular, a user is able to "drag and drop" audio tracks to icons that are respectively indicative of one or more networked wireless speaker devices, thereby to affect playback of those audio tracks via those speaker devices.

Some embodiments of the invention described herein are applicable to networked media playback devices. A networked media playback device is a hardware device capable of rendering digital media delivered to it via a computer network. In much of the description herein, wireless speakers are used as an example of networked digital media playback device. Those of ordinary skill in the art would readily be able to modify the description provided herein that is for wireless speakers and apply the methods and apparatuses to other discrete media devices. The description is provided in terms of wireless speakers in order to keep the description simple and not obscure various significant concepts.

Some embodiments of the invention described herein are applicable to networked media playback systems. A networked media playback system is a system that allows one or more networked media playback devices connected via a computer network to render digital media in a synchronous matter. In much of the description herein, a wireless audio system is used as an example of a networked media playback system. Those of ordinary skill in the art would readily be able to modify the description provided herein that is for a wireless audio system and apply the methods and apparatuses to other digital media playback systems. The description is provided in terms of a wireless audio system in order to keep the description simple and not obscure various significant concepts.

Figure 1:
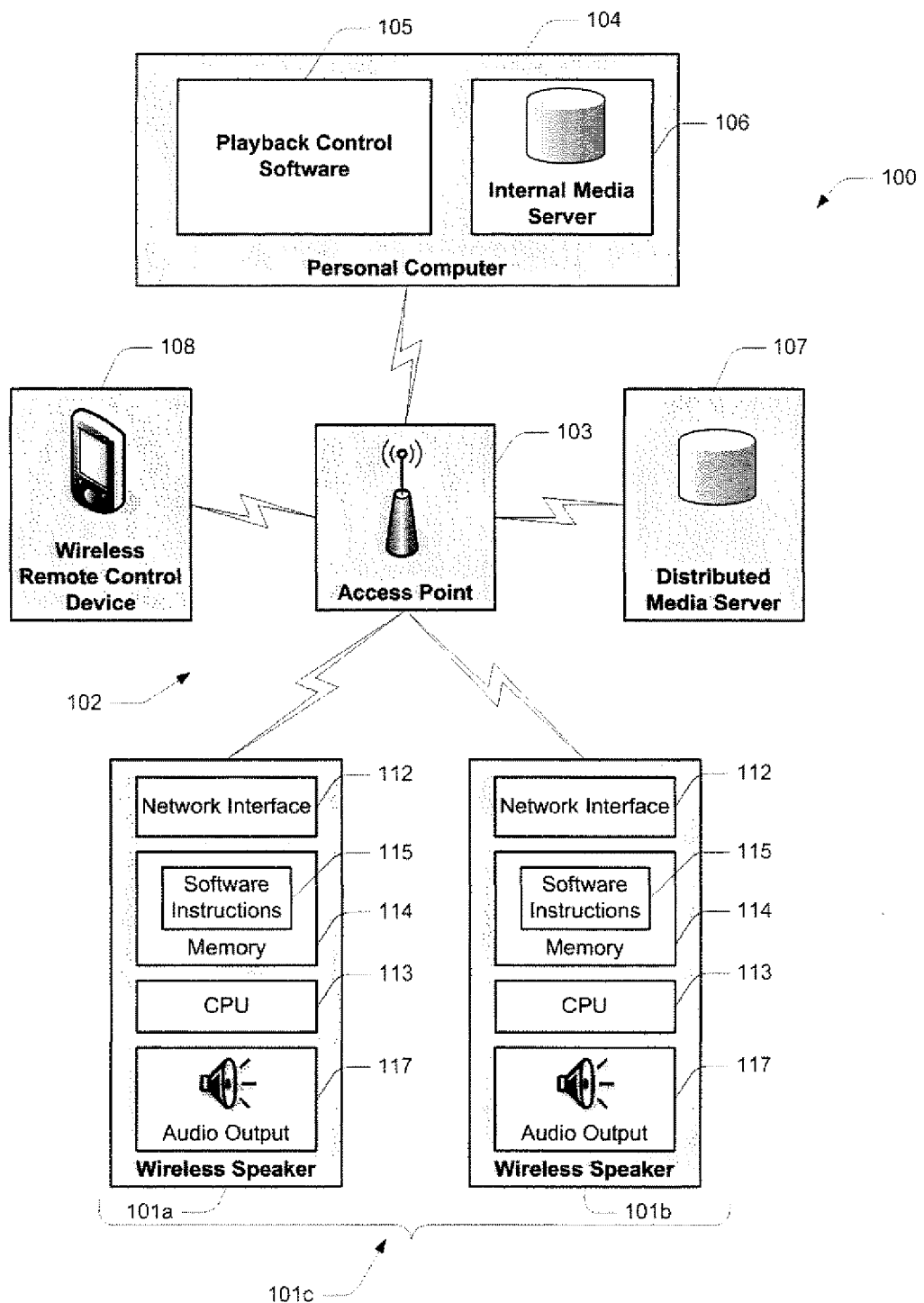
FIG. 1 shows a networked media system according to one embodiment.

FIG. 1 illustrates a basic digital media playback system 100. System 100 includes two wireless speaker devices, in the form of wireless speakers 101a and 101b. These wireless speakers are controllable individually, or collectively as a speaker set 101c. Speakers 101a and 101b connect to a wireless network 102 by way of an access point 103, in the present circumstances being a wireless network in accordance with the IEEE 802.11 standard.

Also connected to network 102 is a personal computer (PC) 104. PC 104 includes a memory module for maintaining software instructions indicative of a software application for coordinating playback of media via wireless speakers 101a and 101b, as well as via speaker set 101c. In the present example, this software application is identified as playback control software application 105. Also stored in the memory of PC 104 is data indicative of a plurality of media items, such as audio tracks (e.g. WAV, MP3 and other digital audio files). In this manner, PC 104 effectively provides the functionality of a media server 106.

In the present example, a distributed media server 107 is also connected to network 102. This media server, in some embodiments, includes a portable media playback device (such as an MP3 player) mounted in a networked cradle device, thereby to allow playback of media items stored on the portable device over the network. Furthermore, a wireless remote control device 108 is connected to the network, this remote control device being configured to allow playback of media items via the wireless speakers 101a and 101b and/or speaker set 101c. This may include an 802.11 type networked remote control, or other networked device. For example, a control device might take the form of a portable electronic device having an 802.11 type network connection (such as a cellular phone, PDA, portable media player, or the like), or a purpose-built remote having a 802.11 type network connection. In some embodiments, device 108 interacts with PC 104 by way of a thin-client arrangement. For example, device 108 shows a GUI for software application 105, although the processing underlying utilization of that GUI substantially resides in PC 104.

Each wireless speaker 101a and 101b includes a network interface 112 for connecting to network 102, in the present example via access point 102. Data indicative of command signals is received via this network, along with data indicative of digital media for playback. A central processing unit (CPU) 113 operates in conjunction with memory 114, and is responsible for rendering content, processing command signals, and the like. Memory 114 includes software instructions 115, which, among other functions, allow wireless speakers 101a and 101b to perform various methods, including methods described herein. It is noted that not all instructions required for performing these methods need be in memory 104 at a given time. Wireless speakers 101a and 101b additionally include respective audio outputs 117 (which in some embodiments includes one or more speaker cones or analogue outputs), allowing playback of rendered digital media as analogue audio.

Wireless speaker set 101c does not have a discrete hardware manifestation. Rather, in the present example, wireless speaker set 101c is a virtual device embedded on speaker 101a (i.e. advertised and controlled using hardware components of speaker 101a), which adopts the role of a lead speaker in the context of the set. The set operates as a stereo pair (i.e. one speaker renders and plays back a left channel signal, the other a right channel signal). This functionality is described in more detail further below. However, for the time being, it is sufficient to note that speaker set 101c provides a location to which playback instructions are able to be provided so as to affect playback of audio tracks via the speaker set.

It will be appreciated that system 100 is illustrated for the sake of example only, primarily to illustrate various components relevant to embodiments discussed herein. However, it will also be appreciated that the present disclosure is equally applicable to arrangements having a greater or lesser deal of complexity as compared with system 100. For example, in further embodiments there is a larger number of wireless speakers, which might include a plurality of individual wireless speaker sets. For the sake of the present disclosure, the following terminology is used:

Wireless speaker. This is an individual wireless speaker (also refereed to as a "wireless speaker device" or "wireless speaker subsystem unit"), being an individually discoverable and controllable device that receives digital audio streamed over a network, and renders that data to provide an analogue output. In some cases the analogue output is provided via one or more speaker cones, and in other cases via an audio output jack or the like.

Wireless speaker group. A wireless speaker group (or "group") includes a plurality of wireless speakers (although in some embodiments a wireless speaker group may be defined to include only a single wireless speaker). In some embodiments a wireless speaker group presents a virtual device interface for receiving playback/control commands directed to the group as a whole. Generally speaking, a wireless speaker group is defined for a set of wireless speakers that are, in practical terms, intended to operate as a collective. Common examples include stereo pairs, or multi channel surround sound arrangements (such as 5.1 channel surround sound).

(a) Wireless speaker zone. A wireless speaker zone (or "zone") includes at least one wireless speaker group, in combination with one or more further wireless speakers and/or wireless speaker groups. In the present embodiments, zones are defined for the sake of convenience, rather than practical necessity. For example, zones are generally defined to allow synchronous playback of audio across a region, such as a floor of a house, or a house as a whole. In some embodiments a wireless speaker zone presents a virtual device interface for receiving playback/control commands directed to the zone as a whole. The constituent groups and/or speakers also provide respective virtual interfaces, for example to allow volume individual control across portions of the zone.

In general, detailed considerations in respect of the operation and interoperation of speakers, groups and zones falls beyond the scope of the present disclosure, which requires only a general understanding of the meaning of these terms.

Figure 2A:
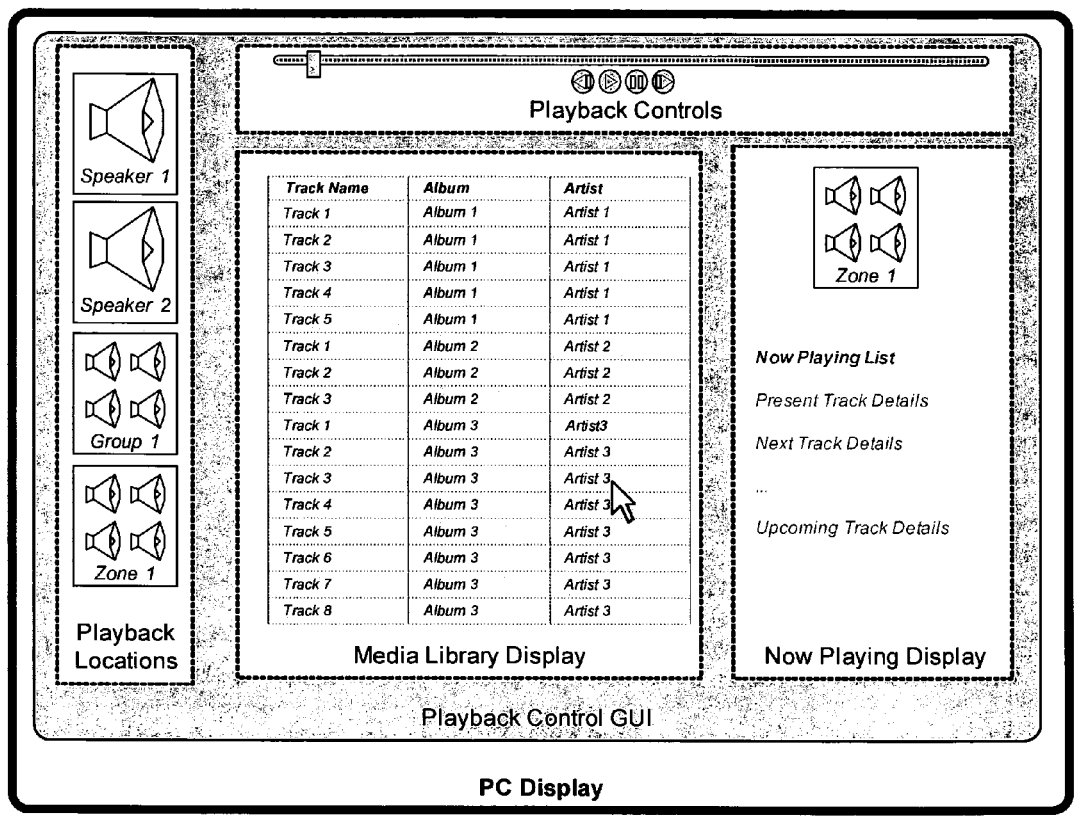
FIG. 2A shows a screenshot from a software application according to one embodiment.

FIG. 2A illustrates an exemplary screenshot from playback control software 105. This screenshot, along with others provided herein, is schematic only and should not be regarded as necessarily limiting in any way. That is, screenshots provided are illustrative of relatively rudimentary interfaces, substantively simplified to facilitate convenient understanding of significant features and functionalities. Those skilled in the art will appreciate how interfaces having varied appearances might be implemented in practice, whilst preserving such features and functionalities.

In the example of FIG. 2A, software application 105 provides on a PC display 200 a playback control GUI 201. GUI 201 includes a "media library display" screen region 202, which provides a graphical display of items in a media library. For example, this might include a listing of available audio tracks available for playback, with details such as the name of the track, artist and album, optionally along with other details. The available audio tracks are maintained at various locations on network 102, including PC 104 and/or media server 107. There are various known methods for arranging and graphically presenting such information, including the use of album covers, playlists, and so on. In the present context, the crux of the matter is that a user, by way of a cursor 203, is able to select one or more media items for playback. This might include selection of one or more individual audio tracks, or selection of one or more albums/playlists/etc that each include one or more individual audio tracks.

GUI 201 additionally provides a "playback locations" region 204 for displaying a plurality of player icons. Each player icon is indicative of a respective one or more networked media playback devices. For instance, in the example of FIG. 2A, four exemplary player icons are shown:

Player icon 204, which is indicative of a wireless speaker, identified by the name "Speaker 1".
Player icon 206, which is indicative of a wireless speaker, identified by the name "Speaker 2".
Player icon 207, which is indicative of a wireless speaker group, identified by the name "Group 1".
Player icon 208, which is indicative of a wireless speaker zone, identified by the name "Zone 1".

These are provided for the sake of the present example only. In a practical example, the identifying names are typically more descriptive of the function/purpose/location of a particular speaker/group/zone. In some embodiments names are user defined. Examples of names might include "kitchen wall speaker 1", "lounge room surround sound system", or "whole house playback". In some embodiments region 204 is configured to allow display of a larger number of icons than shown in the present illustration, for example by way of a scrollbar, hierarchical menus (which may be expandable for groups/zones to identify constituents), and so on.

In some embodiments, icons are added to region 204 upon speakers/groups/zones being discovered on network 102. For example, in some embodiments these speakers/groups/zones are discoverable in accordance with the UPnP protocol.

Figure 2B:
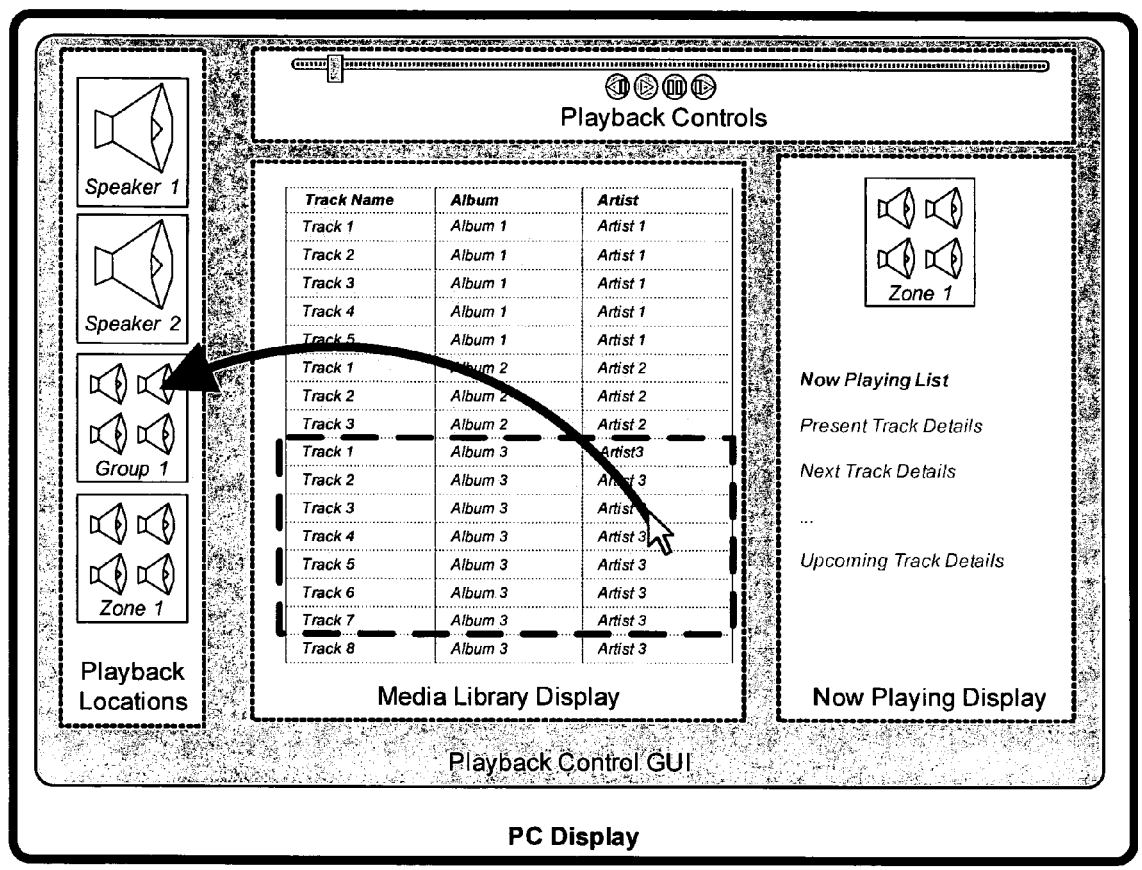
FIG. 2B shows a screenshot from a software application according to one embodiment.

GUI 201 allows a user to graphically manipulate one or more items in the media library on to one of the player icons. This is, in the present example, achieved by performing a selection action followed by a "drag and drop" operation by way of cursor 203. This is schematically illustrated in FIG. 2B, where a plurality of audio tracks are graphically manipulated onto the player icon for Group 1. Software application 105 is responsive to this graphical manipulation for providing an instruction to commence playback of these selected tracks via Group 1. It will be appreciated that the tracks are not played back simultaneously, but rather sequentially. The sequence might be defined by the track order shown in the media library at the time of selection, randomly, or by another approach.

In the present embodiment, a "now playing" list is defined corresponding to each player icon. This "now playing" list is indicative of none or more audio tracks that are designated to playback via the relevant speaker/group/zone. In this manner, the dragging and dropping of one or more audio tracks to a player icon results in those one or more tracks being added to the "now playing" list for that player icon. Whether the one or more tracks in question is added to the beginning, end, or elsewhere in the "now playing" list varies between embodiments, and is in some cases subject to user determination.

In the present example, the "now playing" list for a given speaker is displayed in a "Now Playing Display" region 210. Region 210 displays a player icon to identify which speaker/group/zone is being dealt with at a particular time. In the present example, player icon 208 for Zone 1 is displayed. Region 210 also displays the relevant "now playing" list, and in the present example a list 211 for Zone 1 is displayed.

GUI 201 also provides playback controls for controlling standard playback functionalities, such as play, stop, next track, previous track, etc. These controls act in respect of whichever player icon is shown in region 210 at a given time. That is, in the illustrated example, the playback controls are used to control playback for Zone 1. Additional controls are provided in further embodiments, such as volume control, and various advanced controls (including surround sound controls, equalization, and so on).

In the present embodiment, a user selects a player icon in region 204 to access that player icon in region 210. For example, to view the "now playing" list for Speaker 1, and control playback at Speaker 1, a user clicks icon 205 in region 204. Additionally, by dragging and dropping tracks to a give player icon, that player icon is automatically displayed in region 210.

In some embodiments there is an additional functionality whereby tracks are able to be dragged and dropped directly to a given "now playing" list.

In the present embodiment, there is no follow through of playback information from a group/zone to its constituents in terms of region 210. For example, assume Group 1 includes Speaker 1. When there are tracks in the "now playing" list for Group 1, the "now playing" list for Speaker 1 might be empty (in fact, this is likely to be the case). Moreover, in some embodiments speaker/group/zone interrelationships are defined such that where playback commands are sent directly to a member of a group/zone, that member temporarily leaves the group/zone to carry out those playback commands.

In some embodiments, a functionality is provided whereby of a first one or more of the player icons are able to be manipulated onto a second player icon. Software application 105 is responsive to this for defining a networked media playback zone/group including:

The none or more networked media playback devices of which the first one or more of the player icons are indicative.

The none or more networked media playback devices of which the second one of the player icons is indicative.

Generally speaking, this is used to create new groups/zones and/or to modify existing groups and/or zones. This will be better understood by reference to FIG. 3A and FIG. 3B, which illustrate a further exemplary screenshot from GUI 201.

Figure 3A:
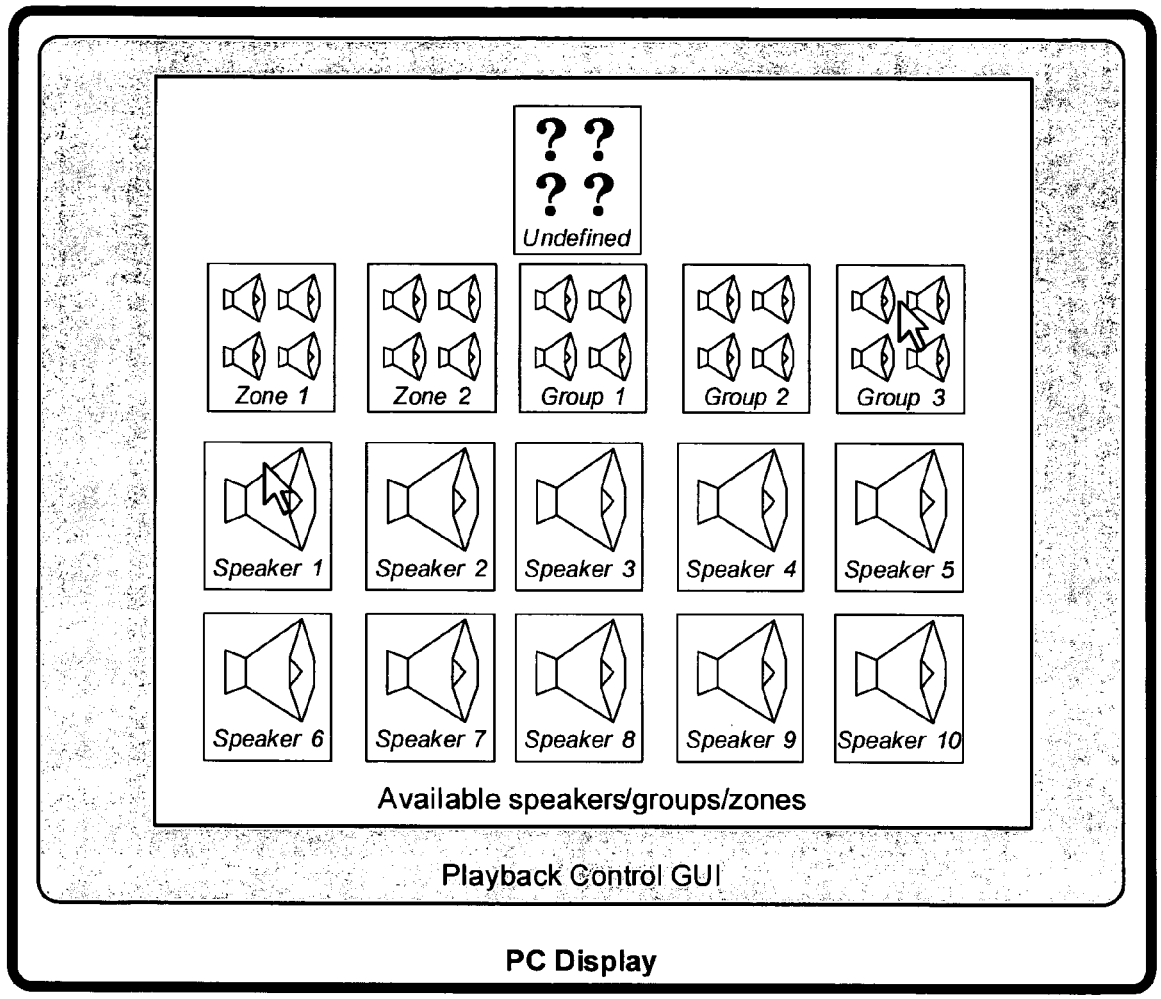
FIG. 3A shows a screenshot from a software application according to one embodiment.
Figure 3B:
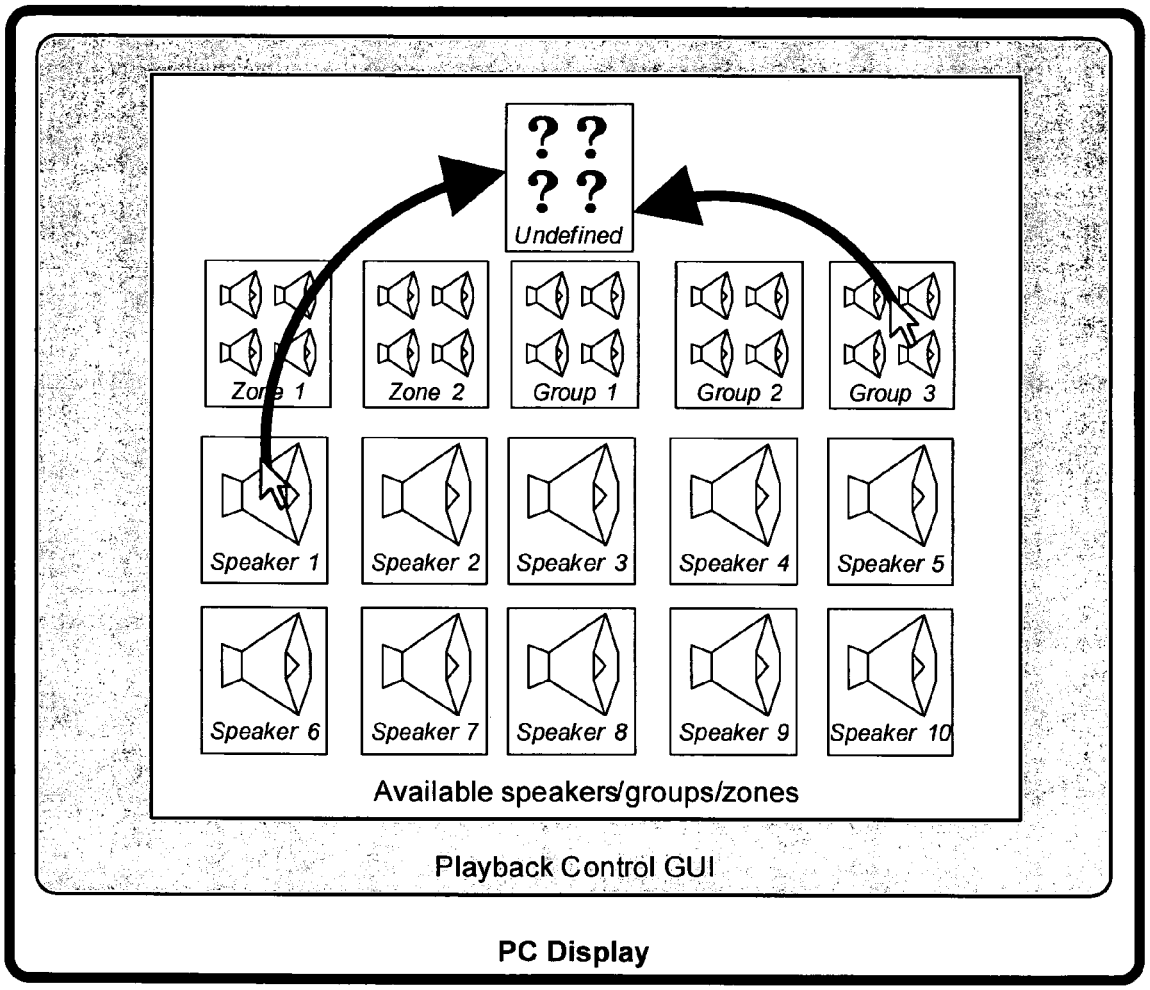
FIG. 3B shows a screenshot from a software application according to one embodiment.

In the context of FIG. 3A, GUI 201 provides a group/zone editor region 301. This region 301 includes player icons 302 for a plurality of available speakers/groups/zones. These include an "undefined" icon 303, which is essentially used to create a new group or zone. The undefined icon is, at least initially, not indicative of any playback devices. Rather, by way of dragging and dropping existing icons for speakers/groups/zones to the undefined icon, a new group/zone is able to be defined. This is schematically illustrated in FIG. 3B.

The precise manner by which the modification of an existing group/zone occurs, in terms of creation of further icons, varies between embodiments. For example, in some embodiments dragging and dropping a first icon onto a second modifies the second icon (i.e. modifies the underlying group/zone). In other embodiments dragging and dropping a first icon onto a second icon leaves the second icon unchanged, and instead creates a third icon for a new modified group/zone.

Figure 4A:
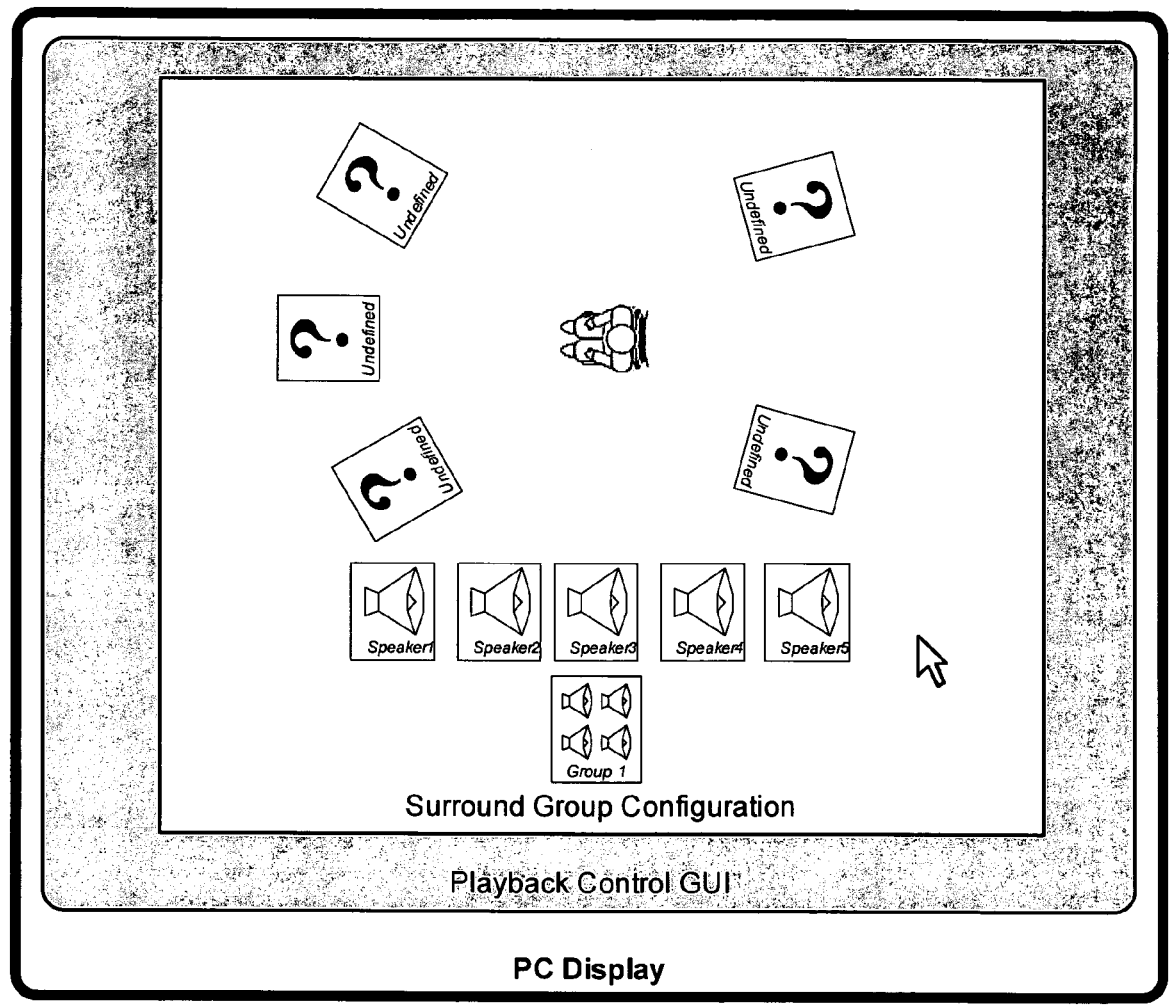
FIG. 4A shows a screenshot from a software application according to one embodiment.
Figure 4B:
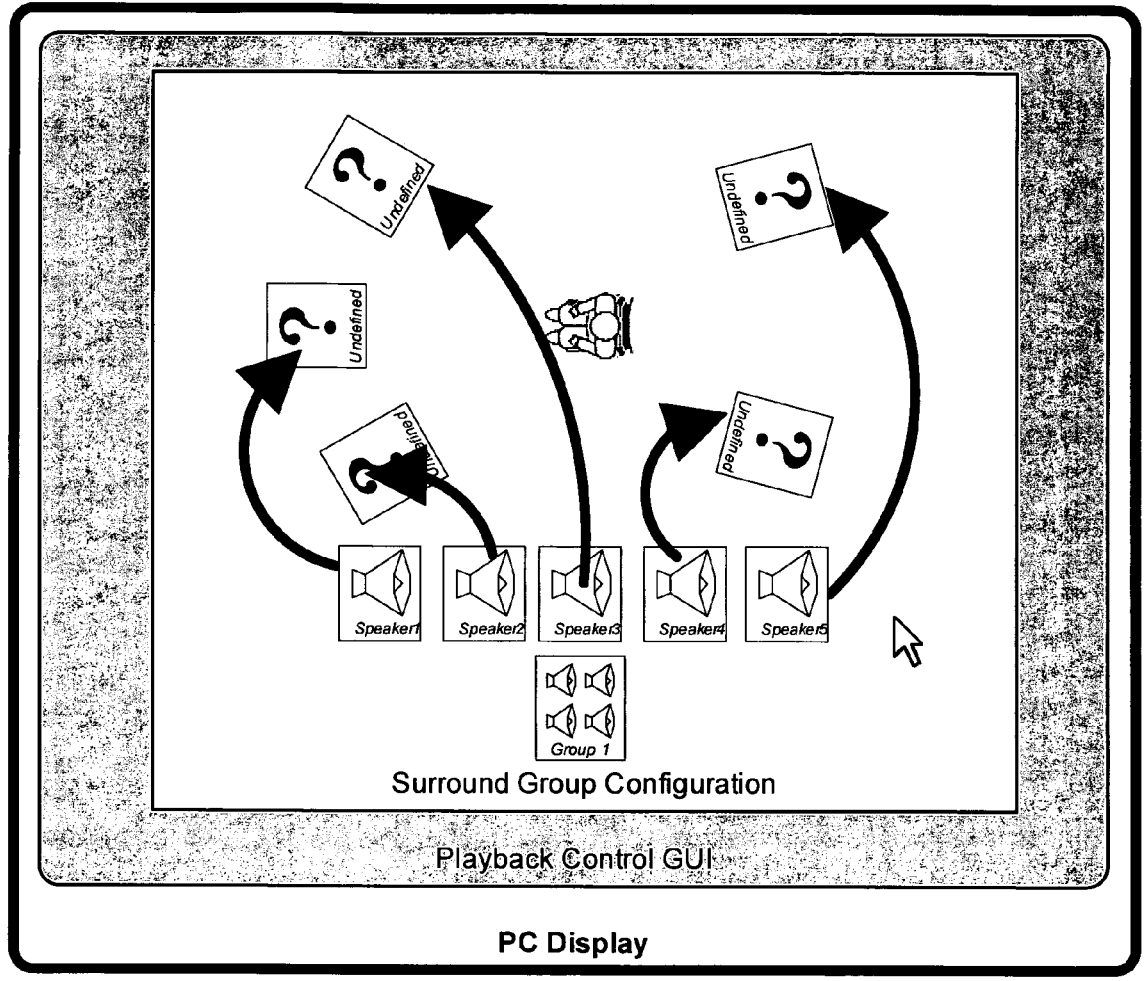
FIG. 4B shows a networked media system according to one embodiment.

FIG. 4 illustrates a further example of how drag and drop functionality is used in some embodiments. In this case, it is used to facilitate configuration of a 5-speaker surround sound arrangement. In this example, GUI 201 provides a "surround group configuration" region 401.

In this example, a user makes various menu selections to indicate a desire to configure surround sound for a particular group, which in this example is Group 1 (identified by player icon 207). For example, this might be achieved from a "right-click" menu selection in the conventional MS Windows environment. By way of region 401, GUI 201 illustrates the constituent speakers of Group 1 by way of player icons 404. In this example, there happen to be five speakers in Group 1, named Speakers 1 to 5. Region 410 also displays a graphical representation of a surround sound system 403, including a plurality of speaker location icons 404 to 408, respectively indicative of a center speaker, right-front speaker, left-front speaker, right-rear speaker, and left-rear speaker. By dragging and dropping the player icons to appropriate location icons, the relevant speakers are assigned appropriate roles in the context of Group 1, such that surround sound is able to be provided. Some further discussion of surround sound provision is provided below.

In some embodiments, a user is able to select one of player icons 404 in region 401 to obtain a test signal. For example, in one embodiment, "double clicking" on one of icons 404 results in a playback command being provided to the relevant speaker such that a short test signal is provided. This allows a user to physically locate a particular speaker, and therefore assists in the determination regarding which of the location icons is appropriate.

It will be appreciated that the graphical user interfaces discussed above provide for various useful user interfaces for managing the operation of networked media playback devices.

Provided below is some general discussion regarding the manner by which groups and zones are defined, discovered and controlled according to some embodiments. This is provided for the sake of explanation only, and should not be regarded as necessarily limiting on the examples above. That is, in some embodiments, interfaces and methodologies as described above are implemented in respect of approaches other than those discussed below.

Figure 5:
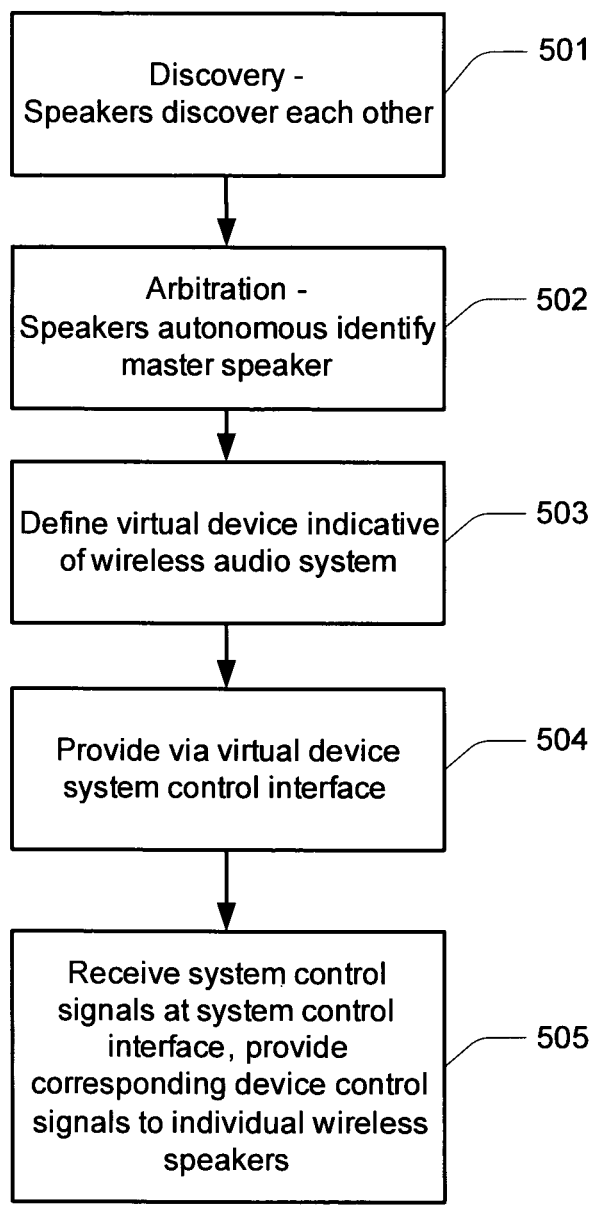
FIG. 5 shows a flowchart of one method embodiment for providing a wireless audio system.

FIG. 5 is a flowchart that illustrates a method for providing a multimedia system in the form of a wireless audio system. In overview, several individual wireless speaker subsystems are activated, each wireless speaker subsystem including a wireless network interface for allowing connection to a wireless network, e.g., a wireless local area network (WLAN) conforming to the IEEE 802.11 standard. These wireless speaker subsystems connect to a common wireless network—for example by association to an open access point.

The method of FIG. 5 is described by reference to a number of sub-processes. It will be appreciated that in various embodiments these sub-processes are performed in parallel or series. Sub-process ordering and particular examples should not be regarded as limiting.

Sub-process 501 represents a discovery sub-process where the wireless speaker subsystems are discovered by one another and by other devices on the network. In practical terms, discovery is a process whereby networked devices—including the wireless speaker subsystems and other devices—share data indicative of themselves and advertise their respective capabilities. For example, a wireless speaker subsystem advertises capabilities including wireless audio playback. A significant result taken from sub-process 501 is that the wireless speaker subsystems discover one another. Sub-process 501 is discussed in greater detail further below by reference to a specific example.

At sub-process 503 a virtual device is defined. A virtual device is a device which presents a single proxy interface to a collection of networked media devices to allow for a single control interface to these devices. Furthermore, a virtual device is a networked device that does not have a conventional hardware manifestation. Both the terms "group" and "zone" as used in this disclosure are virtual devices. In the example described herein, the virtual device is referred to as a "group" because it represents a plurality of networked multimedia devices (the wireless audio system).

In the present embodiment, a virtual device (a group or a zone) does not have a conventional hardware manifestation in the sense that the wireless audio system includes several individual wireless speaker subsystems. Virtual devices are discoverable on a network in the same way as physical devices. Physical devices communicate with virtual devices as they would with other physical devices. In the present embodiment a virtual device has its own IP address. In other embodiments, however, virtual devices do not have LP addresses, for example as a result of a lower-level protocol running atop that virtual device. In some embodiments a virtual device includes one or more virtual sub-devices, and the virtual device has an IP address whilst the virtual sub-devices may or may not have respective IP addresses.

At sub-process 504 a system control interface is provided via the group. This interface is enabled for receiving a system control signal indicative of an operational change to the wireless audio system. In particular, a signal or message provided to the group (for example by using the IP address of that device) is received by the system control interface. The term "operational change" should be read broadly to include substantially any change in state of any device either physical or virtual. For example: in the present context operational changes might include wireless speaker subsystem volume adjustment, other audio amplification settings, media playback control, and so on.

Providing the system control interface in some embodiments includes advertising on the network the group—for example in accordance with one or more open or other proprietary networking protocols. The group advertises the capability of a wireless audio system, and this capability is discoverable and controllable on the network. A user wishing to apply an operational change across the wireless audio system—such as a volume adjustment—provides a system control signal indicative of this change to the group. This is dealt with at sub-process 505.

At sub-process 505, a system control signal is received. In response to the system control signal, corresponding device control signals are provided to each of the wireless speaker subsystems to implement the operational change across the wireless audio system.

The term "system control signal" refers to a signal, message or data packet that is directed to the group for applying an operational change across the wireless audio system. A device control signal is a signal, message or data packet that is directed to an individual wireless speaker subsystem for applying an operational change to that particular wireless speaker subsystem. In some embodiments a single device control signal is concurrently provided to a plurality of individual wireless speaker subsystems, such as by way of message broadcast.

In the present embodiment, one of the wireless speaker subsystems is responsible for implementing sub-processes 503 to 505. That is, one of the wireless speaker subsystems defines the group representative of the wireless audio system, provides the system control interface, and is responsive to system control signals for implementing the desired operational changes across the system. Achieving this includes the step of identifying among the wireless speaker subsystems a wireless speaker subsystem, also called a leader wireless speaker subsystem. More specifically, in the present embodiment between sub-processes 501 and 503 there is an arbitration sub-process 502 where each speaker subsystem autonomously decides whether it is to be the leader speaker subsystem based on a predefined comparison protocol. In one embodiment this is performed on the basis that all speaker subsystems on the network are aware of each other.

Various comparison protocols are used among embodiments. For example, in some embodiments each speaker subsystem includes a unique hierarchical identifier, and periodically broadcasts this identifier for reception by other speaker subsystems. In this way each speaker subsystem is able to compile a list of speaker subsystems on the network and their corresponding hierarchical identifiers, and as such make an autonomous decision as to whether or not it is to become the leader. Some further comparison protocols used in other embodiments are discussed further below.

Wireless speaker subsystems that do not determine that they are leader wireless speaker subsystems inherently become slave wireless speaker subsystems, also called member wireless speaker subsystems, and as such do not implement sub-processes 503 to 505. As new wireless speaker subsystems connect to or otherwise appear on the network they scan the network for existing devices, and under certain conditions join existing wireless audio systems. Where a wireless speaker subsystem is not a leader wireless speaker subsystem, that wireless speaker subsystem implements a join sub-process in 506 to confirm its place in a wireless audio system. Join sub-process 506 is not shown in FIG. 5 for the sake of simplicity, however it will be appreciated that it is performed following sub-process 502 by a wireless speaker subsystem that determines itself not to be a leader wireless speaker subsystem. An example of sub-process 506 is found in FIG. 12.

Figure 6:
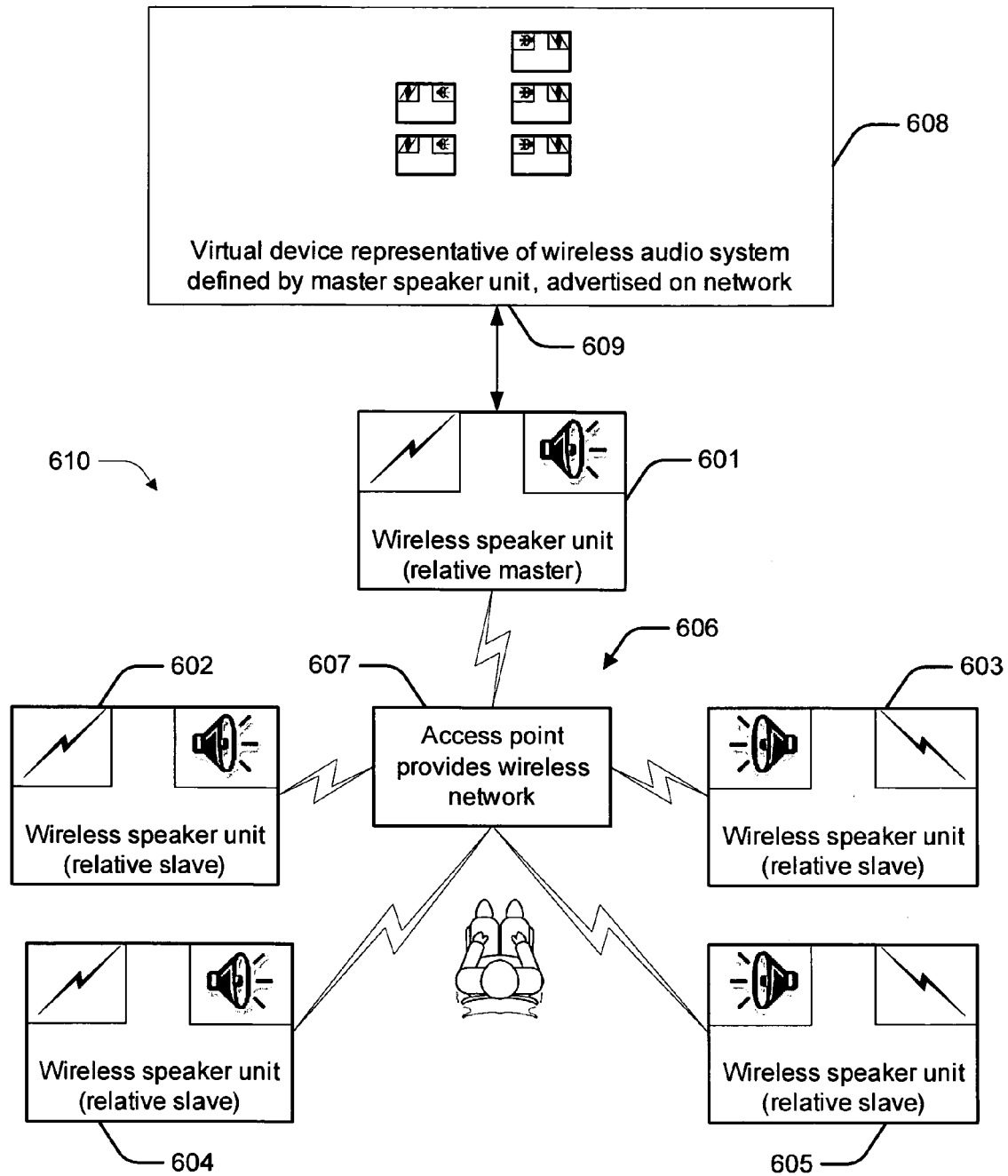
FIG. 6 schematically illustrates a wireless audio system embodiment including a plurality of wireless speaker subsystems.

FIG. 6 shows a wireless audio configuration including five wireless speaker subsystems 601 to 605. These wireless speaker subsystems are activated and automatically connect to a wireless network 606. Network 606 is provided by an open access point 607, and in connecting to network 606 each of the wireless speaker subsystems associate to access point 607. Access point 607 is "open" in the sense that wireless speaker subsystems 601 to 605 are able to associate without the need to grant in advance special permissions. In some embodiments such permissions are required. A method in line with that disclosed in FIG. 5 is carried out to provide a wireless audio system 610 including wireless speaker subsystems 601 to 605. In particular, a group 608 is defined, this device being representative of wireless audio system 610. Group 608 provides a system control interface 609 which receives system control signals for implementing operations changes across system 610.

From a terminology point of view, group 608 describes a discoverable group on network 606 that provides a capability in the form of a wireless audio system. System 601 describes the hardware making up the wireless audio system—including individual wireless speaker subsystems 601 to 605.

Although in FIG. 6 group 608 is shown as being separate from the leader wireless speaker subsystem, it will be appreciated that in a practical sense the group exists within and shares the hardware of the leader wireless speaker subsystem. Whilst messages are sent directly to the group, in a physical sense those messages are received by the network interface of the leader wireless speaker subsystem. This network interface may be a physical device such as a network interface, or alternately a logical interface.

Wireless speaker subsystems 601 to 605 have not been pre-configured to act as a group. They are off-the-shelf wireless speaker subsystems that, as discussed below, implement instructions to substantially autonomously arrange themselves to provide a wireless audio system such as system 610.

In the present embodiment wireless speaker subsystems 601 to 605 are provided by a single manufacturer, and as such implement generally the same protocols and procedures. They are of the same or a similar model—similar in that they may differ in details such as color, appearance, in size or speaker cone configuration. Each wireless speaker subsystem is uniquely identifiable electronically by one or more respective identifying features, such as unique MAC addresses. In other embodiments several different makes of wireless speaker subsystem are used.

Once activated, wireless speaker subsystems 601 to 605 undergo a discovery process in sub-process 501. There are a number of known discovery protocols that manage precisely how discovery takes place. In various embodiments of this invention discovery protocols such as Universal Plug and Play (UPnP) Bonjour and Jini are used, as well as proprietary discovery protocols. Bonjour is a general method to discover services on a local area network, and was formerly called Rendezvous. It is Apple's trade name for its implementation of the Zeroconf specification framework. For Jini, see www.jini.org.

Figure 7:
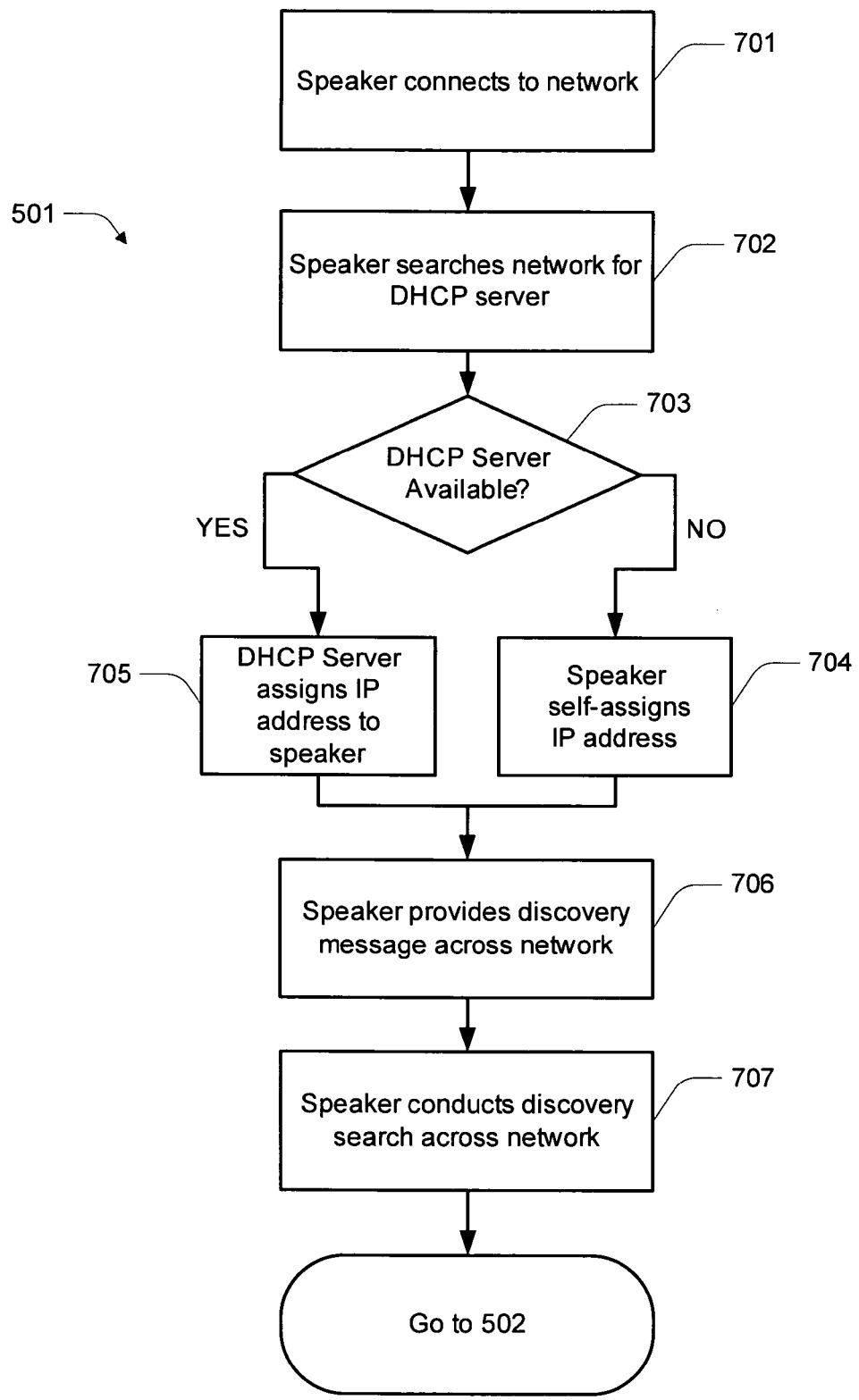
FIG. 7 shows a flowchart of an embodiment of a method performed by a wireless speaker subsystem.

The discovery process used in the present embodiment is shown in FIG. 7, and described below by reference to wireless speaker subsystem 601. It will be appreciated that this is provided as an example only, and in other embodiments other discovery processes are used.

Wireless speaker subsystem 601 connects to network 606 at step 701 in sub-process 501. Wireless speaker subsystem 601 implements Dynamic Host Configuration Protocol (DHCP) client, which searches for a DHCP server at step 702. Such a server is generally responsible for the assignment of IP addresses across a network, such as network 606. If, at decision 703, no DHCP server is available, wireless speaker subsystem 601 self-assigns an IP address at step 704. Otherwise, an available DHCP server assigns an IP address to wireless speaker subsystem 601 at step 705. In either case, the IP address assigned is used by wireless speaker subsystem 601 in subsequent network operations.

Once an IP address is assigned, the wireless speaker subsystem 601 advertises itself across network 606 at step 706. In particular, wireless speaker subsystem 601 provides a discovery message that communicates to wireless speaker subsystems 602 to 605 and other devices on network 606 a relatively small data packet indicative of wireless speaker subsystem 601. For example: data indicative of a type or identifier, and a URL indicative of a location from which more detailed information is available. In the present embodiment the data packet includes the wireless speaker subsystem's MAC address.

Although the present embodiment is described by reference to the use of IP addresses, that should not be regarded as limiting. For example, in one embodiment layer two encapsulated packets are used, optionally in conjunction with a proprietary discovery protocol adapted to make use of such packets. In one such embodiment only MAC layer access is required, as opposed to higher layer access such as IP layer access.

Step 707 includes conducting a discovery search across network 606 for devices of interest—such as other wireless speaker subsystems or groups representative of wireless audio systems. The discovery search includes the provision of a probe frame, and in response to this probe frame a similar discovery message to that mentioned above is provided by each complementarily discoverable device on network 606 to wireless speaker subsystem 601. This includes wireless speaker subsystems 602 to 606.

It will be appreciated that, following this discovery process, each wireless speaker subsystem 601 to 605 discovers the other wireless speaker subsystems regardless of the order in which the wireless speaker subsystems connect to network 606. For instance, the first wireless speaker subsystem to connect discovers the other wireless speaker subsystems as they connect and advertise themselves. The last wireless speaker subsystem to connect discovers the other wireless speaker subsystems following a discovery search.

This completes sub-process 501. In the present embodiment each wireless speaker subsystem waits for a predetermined time before progressing to the arbitration sub-process 502. In one embodiment this predetermined time is ten seconds without discovery of a wireless speaker subsystem. That is, if a given wireless speaker subsystem is idle for ten seconds without discovering another wireless speaker subsystem, that wireless speaker subsystem progresses to the arbitration sub-process. In other embodiments alternate time periods are used. In some embodiments alternate rules determine when a wireless speaker subsystem progresses to the arbitration sub-process.

Figure 8:
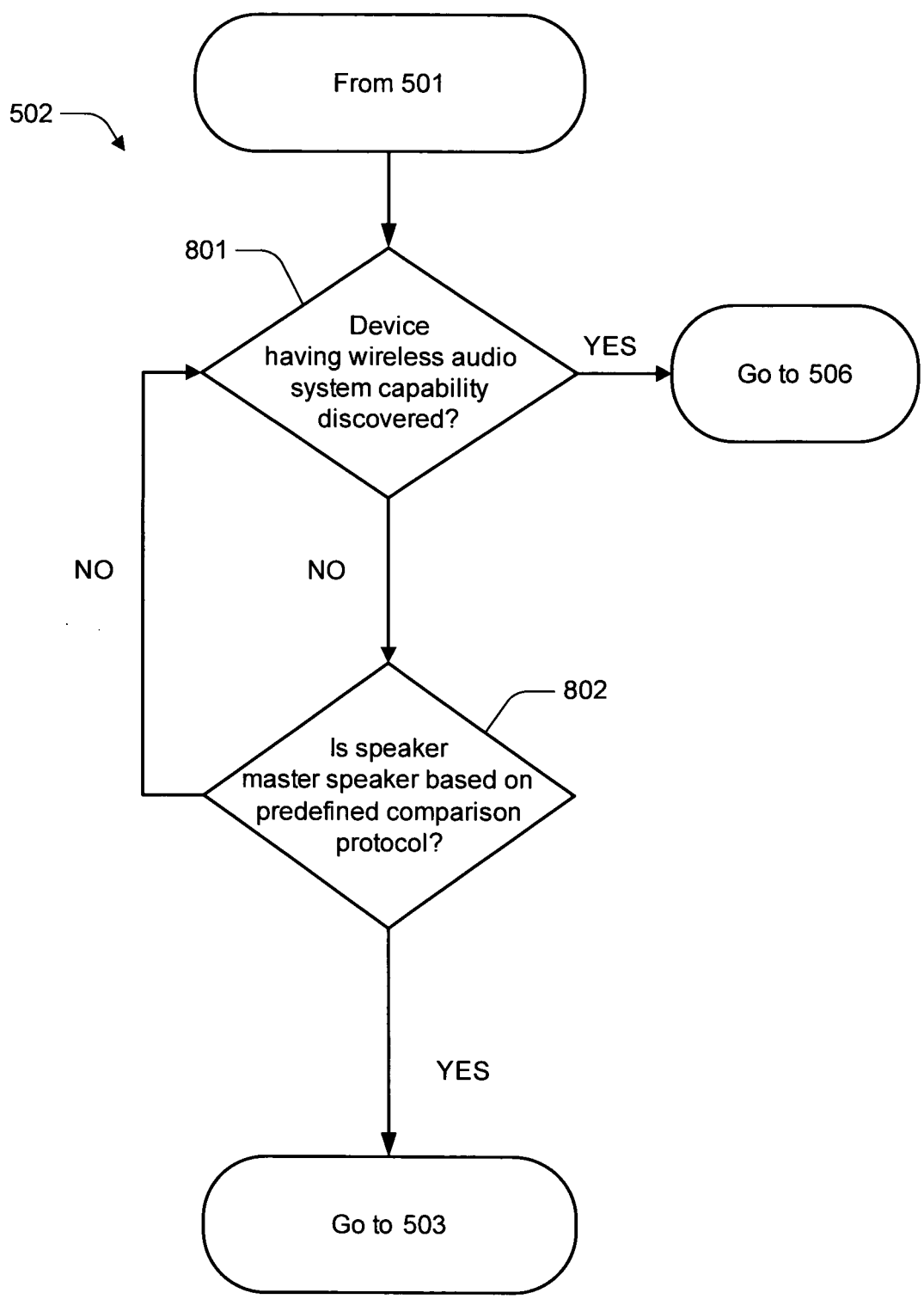
FIG. 8 shows a flowchart of an embodiment of a further method performed by a wireless speaker subsystem.

FIG. 8 shows the arbitration sub-process 502 of the present embodiment. Sub-process 502 commences at decision 801 where wireless speaker subsystem 601 decides whether an existing device having a wireless audio system capability has been discovered. For example, whether an existing group 608 has been discovered. If one has been discovered, the method progresses to sub-process 506. Otherwise the method progresses to decision 802.

At decision 802 wireless speaker subsystem 601 determines whether it is the leader device. As foreshadowed, in this sub-process each wireless speaker subsystem inherently adopts a leader or member role. In the present embodiment, use is made of device MAC addresses, and as foreshadowed MAC addresses are shared during the discovery sub-process. The MAC address for each wireless speaker subsystem is embedded with a hierarchical identifier, such as the numerical value of the final bit in the address. In overview, the wireless speaker subsystems inherently self assign leader and member roles based on comparison protocol that takes into account a comparison of these identifiers. In some embodiments other factors are also used in addition. Given the relative nature of the present comparison protocol, in one implementation a particular wireless speaker subsystem might be leader whilst in another implementation that same wireless speaker subsystem might be a member.

The use of MAC addresses for leader/member assignment should not be regarded as limiting. In other embodiments alternate approaches or combinations of approaches are adopted. Some alternate approaches include, for example:

Assessment of physical factors. For example, in a system having a first wireless speaker subsystem having an input for receiving a SPDIF signal and a second wireless speaker subsystem that does not accept SPDIF signal, the first wireless speaker subsystem can be inherently designed to act as a leader.

The use of a unique hierarchy identifier as part of a discovery message. That is, a wireless speaker subsystem advertises itself in a manner indicative of a hierarchy identifier, and another wireless speaker subsystem recognizes that device as a relative leader or member based on a comparison of the discovered device's hierarchy identifier and its own hierarchy identifier. This is similar to the MAC address approach, but uses another number which may or may not be pre-existing for other networking purposes.

A connection time based protocol where the time at which a wireless speaker subsystem associated to access point 607 determines whether it is the leader. For example, the leader is in one embodiment the first wireless speaker subsystem to associate to access point 607.

If, based on an assessment of the MAC addresses of discovered wireless speaker subsystems, wireless speaker subsystem 601 determines that it is the leader, the method progresses to sub-process 503. Otherwise the method loops to decision 801, and it will be appreciated that this repeats until a group 608 is found. In some embodiments a timeout function is implemented to contain such looping with predefined restraints.

Figure 9:
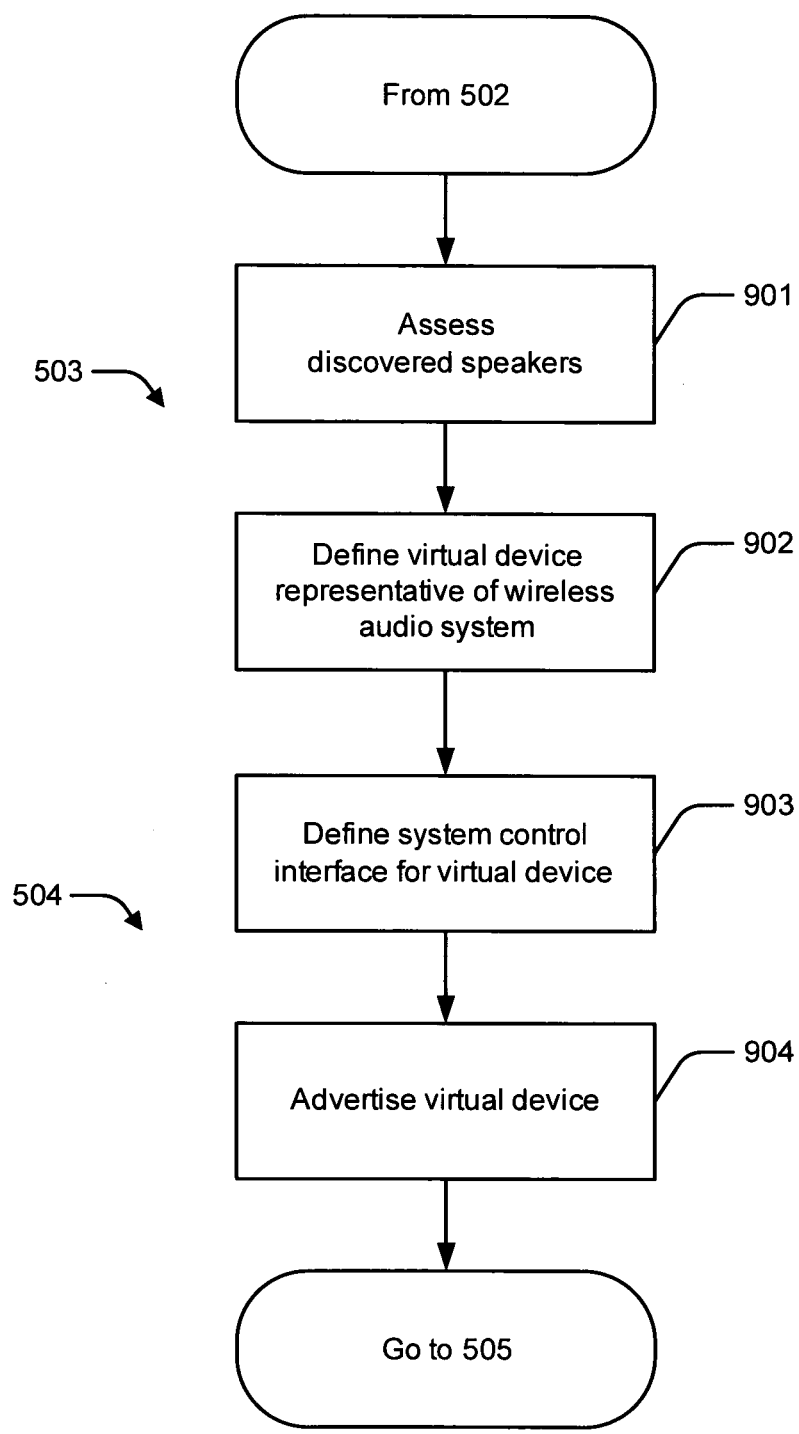
FIG. 9 shows a flowchart of an embodiment of a further method performed by a wireless speaker subsystem.

Sub-processes 503 and 504 of the present embodiment are shown in FIG. 9. As noted above, these sub-processes are only carried out by wireless speaker subsystem 601 where that wireless speaker subsystem determines it is the leader wireless speaker subsystem. At step 901 wireless speaker subsystem 601 assesses the wireless speaker subsystems that have been discovered—specifically wireless speaker subsystems 602 to 605—in terms of type and number. In some embodiments each wireless speaker subsystem is indicative of a location in a surround sound configuration, such as a "front-left" wireless speaker subsystem. In one embodiment each wireless speaker subsystem includes a physical or digital switch that is progressed between a plurality of positions to allow such identification. Based on the assessment at step 901, wireless speaker subsystem 601 defines group 608 at step 902. This definition step includes providing a discoverable description indicative of system 610, and assigning an IP address to device 608. For example, in the present embodiment the description might be of a "five wireless speaker subsystem wireless audio system". In embodiments where surround sound is enabled the description might be of a "five channel surround wireless audio system". This description is in some embodiments modified over time as a result of changes in hardware, such as the addition or removal of wireless speaker subsystems, or as a result of user interaction.

Sub-process 504 commences at step 903 with the definition of interface 609. This is in one embodiment performed based on instructions contained in the memory unit of wireless speaker subsystem 601. That is, wireless speaker subsystem 601 contains instructions indicative of how to define interface 609 based on the wireless speaker subsystems discovered. At step 904 interface 609 is provided, which includes making the interface available on network 606. In the present embodiment this in turn includes advertising device 608. As such, a user or other device on network 606 is able to discover device 608 and by way of interface 609 take control of system 610.

In the present embodiment group 608 is advertised in accordance with the UPnP open networking protocol. As part of this, device 608 provides some additional information itself. Specifically, group 608 provides in its discovery messages URLs to allow access to this additional information. The additional information for each device includes a UPnP description expressed in XML. This description includes a wide range of information, such as:

The availability of a wireless audio system capability, along with the number of wireless speaker subsystems and so on.
  Details regarding how to take control of the wireless audio system capability. For example: command formats, how the system responds, parameters, variables rules and so on. Generally speaking, whatever information is required to allow a control unit to actually take meaningful control.
  A control URL for the system control interface. A system control signal is in some embodiments provided to the control URL to make an operational change to the wireless audio system.

In some cases information can be provided by URL link within the XML description, as opposed to being entirely contained within the description.

In the present embodiment interface 609 is accessible as a graphical user interface via a personal computer on network 606 through a web browser and/or a standalone program executable on a client terminal. A user of the personal computer is able to make complex changes to group 608 in this way—for example configuring surround sound, removing wireless speaker subsystems, setting up groups composed of one or more physical wireless speaker subsystems, zones composed of groups, which are in turn composed of physical wireless speaker subsystems, and so on.

Figure 10:
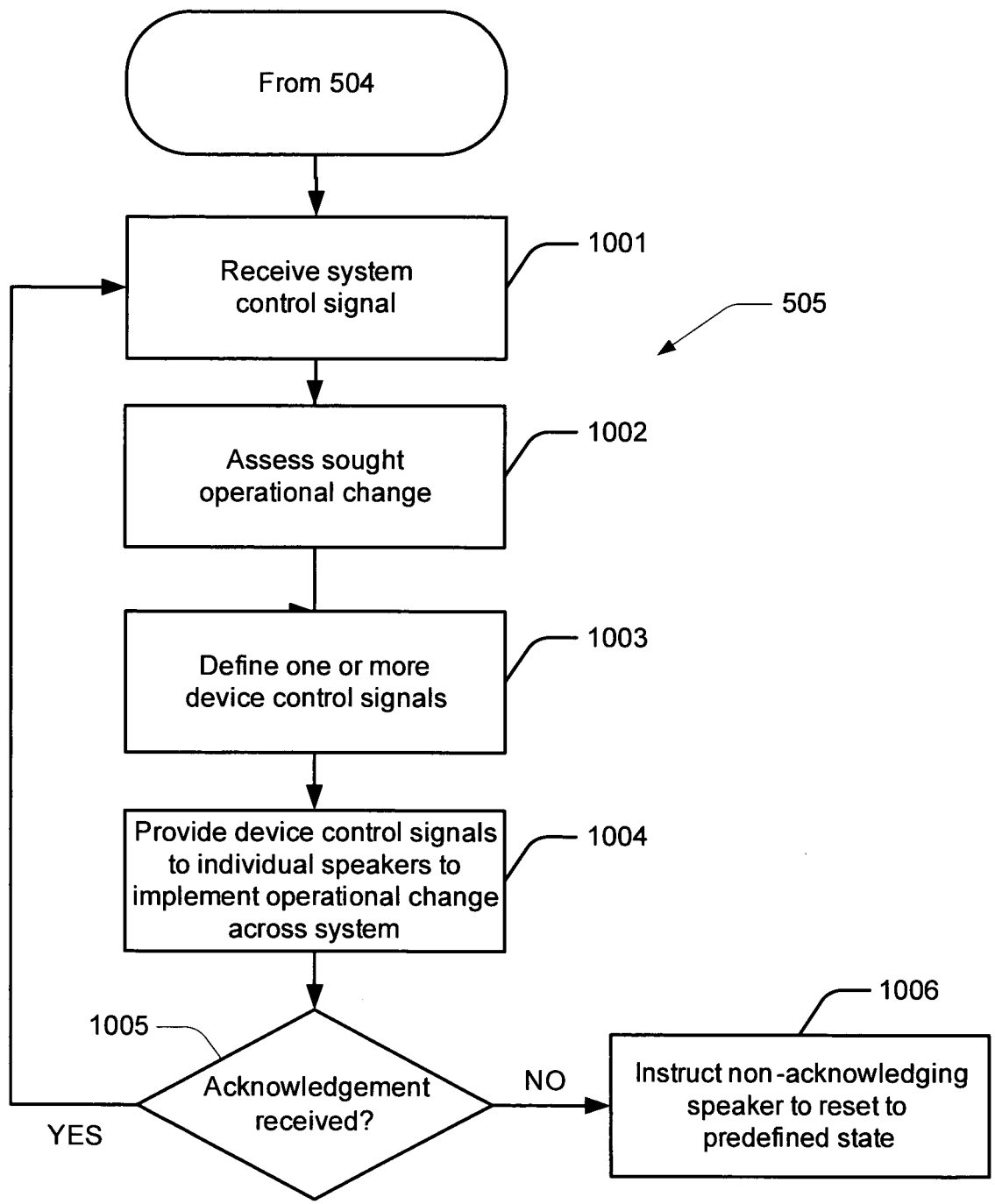
FIG. 10 shows a flowchart of an embodiment of a further method performed by a wireless speaker subsystem.

FIG. 10 illustrates sub-process 505 in greater detail, again in the context of wireless speaker subsystem 601. This assumes that wireless speaker subsystem 601 is the leader wireless speaker subsystem, and that sub-processes 503 and 504 have completed. Sub-process 505 commences at step 1001 with the receipt of a system control signal by system control interface 609. Interface 609 (in physical terms wireless speaker subsystem 601) is enabled to be responsive to the system control signals for assessing the sought operational change at step 1002 and defining one or more corresponding device control signals at 1003. In one embodiment the interface 609 receives commands in the same format each of wireless speaker subsystems 601 to 605 would individually receive control signals, and as such device control signals are the same as the system control signals. In other embodiments the system control signals are different to the device control signals.

Device control signals are provided by interface 609 to each of wireless speaker subsystems 601 to 606 to implement the operational change across those wireless speaker subsystems at step 1004. In the present embodiment this is performed using a custom network protocol based on a one way UDP broadcast message over IP from the leader wireless speaker subsystem (wireless speaker subsystem 601), coupled with a reliable TCP acknowledgement back to the leader from every other wireless speaker subsystem in system 610. This combination enables control signals to be received in a timely manner by all wireless speaker subsystems at a similar time, and also provides an asynchronous fail safe for wireless speaker subsystems that may not have received the message. At decision 1005 interface 609 determines whether acknowledgements have been received from each wireless speaker subsystem within a predetermined time period. If all acknowledgements are received, the method progresses to step 1001. Otherwise, if a wireless speaker subsystem fails to acknowledge a control message within a given time, interface 609 will, via a TCP message, instruct the failing wireless speaker subsystem to reset itself to a predefined state and progress to sub-process 506. This message is provided at step 1006.

In another embodiment device control signals are unicast to the individual wireless speaker subsystems, as opposed to using a one way UDP broadcast message. This alternate approach better provides for individual control of the wireless speaker subsystems.

In some embodiments a device control signal includes data indicative of an execution time. For example, a device control signal is indicative of "apply operational change X at time Y". This allows for synchronisation of command execution such that, in the example of volume control, the wireless speaker subsystems each alter their volume at the same time. It will be appreciated that achieving such synchronisation in some embodiments requires for synchronisation of internal clocks in the individual wireless speaker subsystems. In one embodiment such synchronisation of internal clocks is carried out for the related purpose of ensuring synchronised media playback. In some embodiments the execution time is expressed as an offset of a known time.

Figure 11:
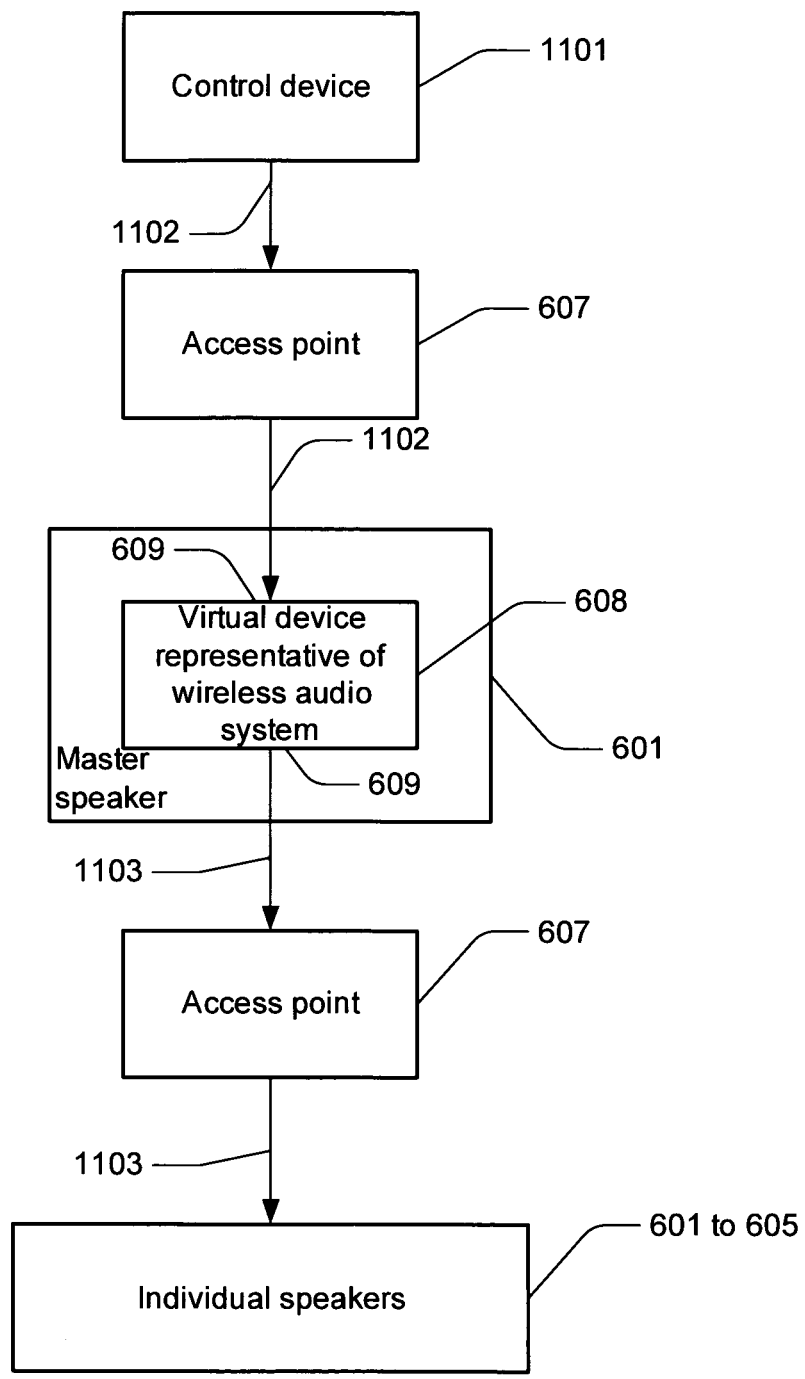
FIG. 11 schematically illustrates data flow in a wireless audio system according to one or more aspects of the present invention.

FIG. 11 schematically illustrates data flow during sub-process 505, and the numerical conventions of FIG. 6 are adopted. In overview, a control device 1101 provides a system control signal 1102, and subsequently corresponding device control signals 1103 are received by wireless speaker subsystems 601 to 605.

It will be appreciated that the above approach involves some redundancy in the sense that interface 609 provides signals to wireless speaker subsystem 601 over network 606 irrespective of the fact that interface 609 is provided by wireless speaker subsystem 601. This redundancy balances with simplicity. In other embodiments wireless speaker subsystem 601 implements the operational change without the need for a device control signal to be sent from device 608 to wireless speaker subsystem 601.

There are two general categories of operational changes that affect system 610. The first of these is a global change that affects every wireless speaker subsystem in the same way. For example: a global increase in volume. In such a case the system control signal is the same as the device control signals, and effectively wireless speaker subsystem 601 is simply responsible for distributing the system control signal as a device control signal to each of the wireless speaker subsystems. The second category is a complex change that affects different wireless speaker subsystems in a different way. For example: where system 610 has been configured to provide a five-channel surround sound configuration, and the operational change affects only a selection of the wireless speaker subsystems. In one example a system control signal is provided to reduce the volume on the front left wireless speaker subsystem, which in this embodiment is wireless speaker subsystem 602. In such a case wireless speaker subsystem 601 is responsible for assessing the system control signal, and defining device specific device control signals. In the present example a single device control signal is defined, this signal being uniquely intended for and provided to wireless speaker subsystem 602, instructing wireless speaker subsystem 602 to reduce its output volume.

It will be appreciated that configuring wireless speaker subsystems 601 to 606 to adopt roles in a complex configuration may involve additional steps and manual intervention. For example, if a 5-channel surround system is desired, it is necessary to identify which wireless speaker subsystem is physically located in which position. Device 608 in some embodiments provides a user interface accessible via a personal computer to assist in such a task.

It is worth noting that the ability of wireless speaker subsystem 601 to control wireless speaker subsystems 602 to 606 hinges on wireless speaker subsystem 601 being privy to information detailing the manner in which those wireless speaker subsystems are controlled. This information is in some embodiments maintained by wireless speaker subsystem 601, or in other embodiments obtained during the discovery sub-process, or in other embodiments even obtained from a remote data source such as the Internet when required. Assuming such information can be obtained, wireless speaker subsystem 601 is able to provide a wireless audio system including wireless speaker subsystems from alternate manufactures. For example, wireless speaker subsystem 601 is able to include substantially any UPnP wireless speaker subsystem in a wireless audio system.

Effectively, wireless speaker subsystem 601 provides by way of device 608 and interface 609 a centralized location for receiving system control signals that effect system 610 as a whole. For example, if there is a desire to increase the volume on all of wireless speaker subsystems 601 to 605, a signal indicative of that operational change is provided to device 608. This circumvents the need for a user to manually provide a signal to each individual wireless speaker subsystem.

In some embodiments device 608 is responsive to the discovery of other controllable devices on network 606 for selectively defining additional groups. For example, a particular wireless speaker subsystem may provide a microphone input, allowing a virtual hands-free telephone device to be created. Group logic maintained on wireless speaker subsystem 501 is able to interrogate devices on the network, determine their capabilities and present a list of possible groups to create given the resources available.

Figure 12:
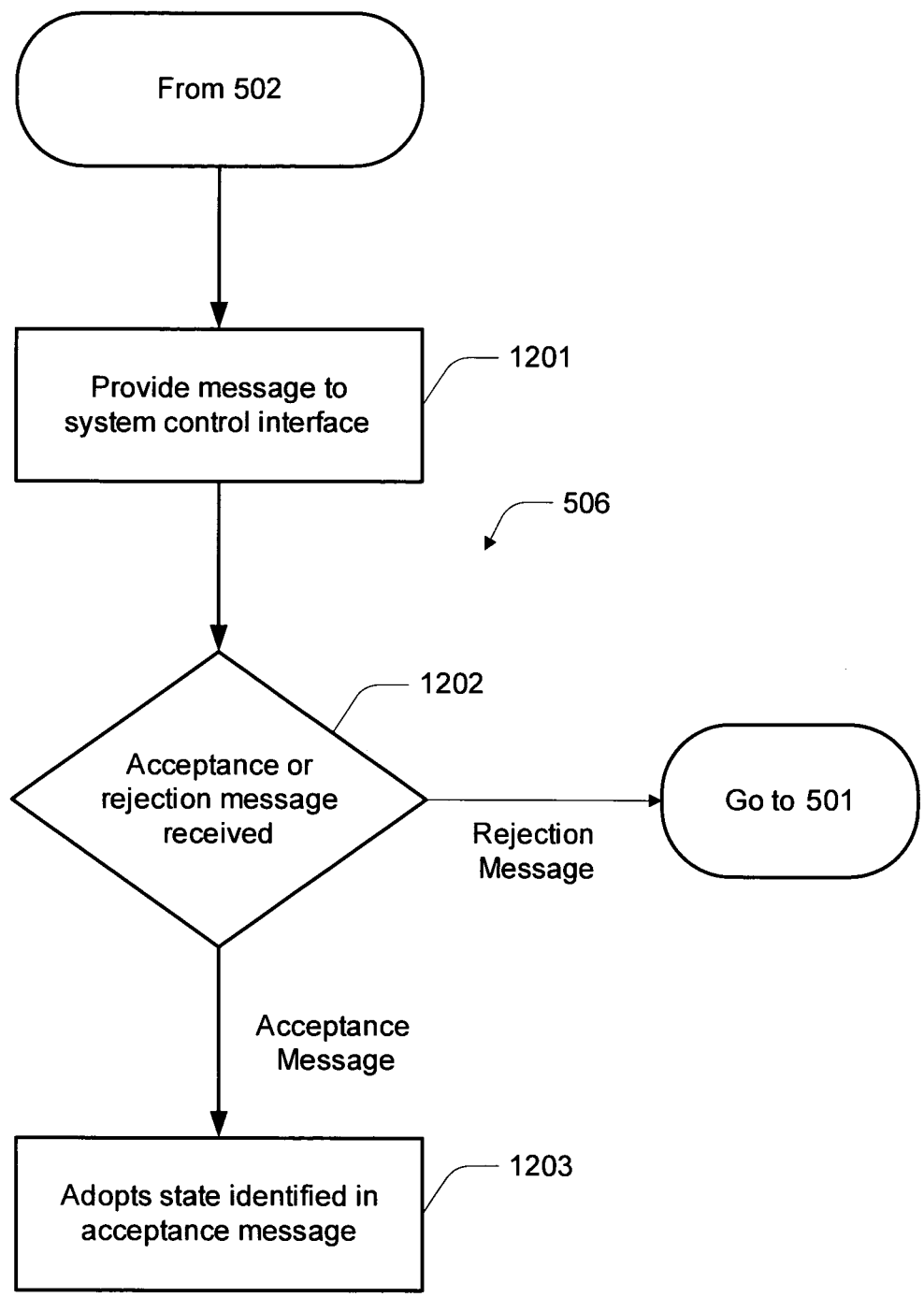
FIG. 12 shows a flowchart of an embodiment of a further method performed by a wireless speaker subsystem.

FIG. 12 illustrates sub-process 506 in greater detail. Given that the above disclosure describes sub-processes 503 to 505 in terms of wireless speaker subsystem 601, this sub-process is described by reference to wireless speaker subsystem 602—which determines during sub-process 502 that it is not the leader. At step 1201 wireless speaker subsystem 602 provides a message to interface 609 indicative of its willingness to participate in system 610. Interface 609 is responsive to such as message for providing an acceptance or rejection, and this is received at decision 1202. In one instance, in the case of rejection, wireless speaker subsystem 602 may return to sub-process 501 to ensure a consistent system state. In the case of acceptance, the acceptance message is indicative of an operational state provided by device 608 that should be adopted by wireless speaker subsystem 602. The rationale is for device 608 to know the state of each wireless speaker subsystem in system 610. In some embodiments device 608 periodically interrogates each wireless speaker subsystem to obtain data indicative of their respective operative states. At step 1203 wireless speaker subsystem 602 adopts the state identified by the acceptance message, and provides a TCP acknowledgement to device 608.

In some embodiments a group which references other groups may be created. A set of groups may be referred to as a zone while a set of physical devices could be referred to as a group. A zone would be created to address the need for multi-room media playback where multiple groups would be required to act on identical media and commonly process commands relating to media playback. A group composed of groups would address the same issues of command and media stream routing between groups' as would be required in an embodiment where a group routs commands to physical devices.

Figure 13:
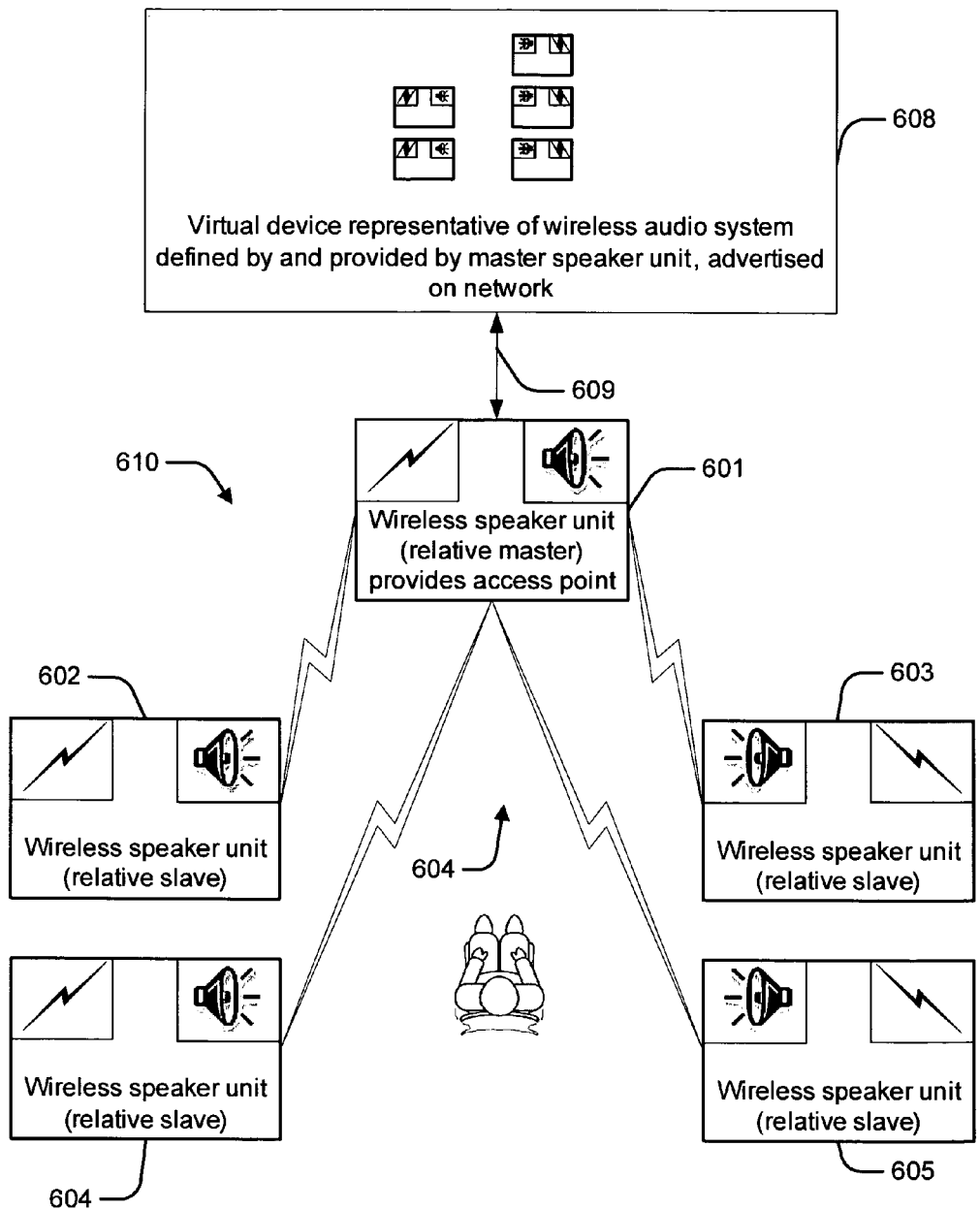
FIG. 13 schematically illustrates a wireless audio system embodiment including a plurality of wireless speaker subsystems.

As noted above, in the embodiment of FIG. 6 wireless speaker subsystems 601 to 605 associate to an existing access point 607. In some instances no access point is provided, and one of the wireless speaker subsystems inherently provides an access point. Such an embodiment is shown in FIG. 13, which adopts the same numbering conventions as FIG. 6. In this embodiment each wireless speaker subsystem scans for an available access point for a predetermined period of time, and if no beacon or probe response frames are received, establishes itself as an open access point. In a similar manner to the leader/member (master/slave) determination technique discussed above, MAC addresses are often used to assist this process. Specifically, in one embodiment, each wireless speaker subsystem scans for a period of time related to the final byte in its MAC address—in some embodiments between about five to ten seconds multiplied by the value of that final byte. If no access point is found within that time, the wireless speaker subsystem initiates its own open access point. It will be appreciated that by such an approach only one of the wireless speaker subsystems need initiate an access point, and the remaining wireless speaker subsystems will associate to that access point. In one embodiment the wireless speaker subsystem providing the access point becomes the leader device, reducing the complexity of sub-process 502.

In some embodiments the wireless speaker subsystems first associate to an open access point, and subsequently self arrange themselves into an internal private network.

Figure 14:
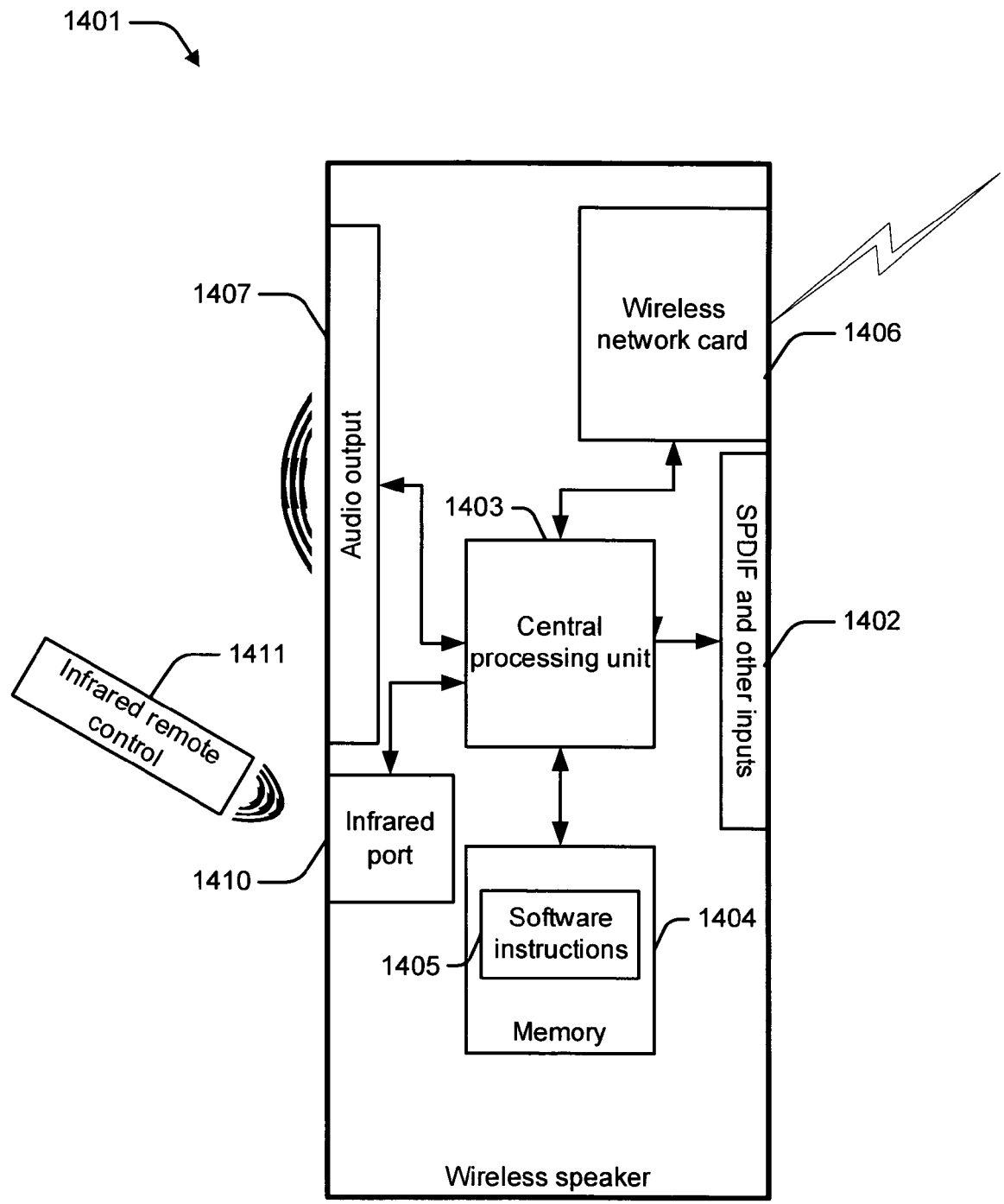
FIG. 14 schematically illustrates an embodiment of a wireless speaker subsystem.

FIG. 14 shows a wireless speaker subsystem 1401 in more detail. This wireless speaker subsystem is appropriate for use in the above embodiments. For example, in some embodiments wireless speaker subsystem 601 is interchangeable with wireless speaker subsystem 1401.

Wireless speaker subsystem 1401 includes an input array 1402 for receiving audio signals. Array 1402 includes a SPDIF input, along with various other standard and proprietary digital audio inputs. In some instances array 1402 includes one or more analogue audio inputs, in which case wireless speaker subsystem 1401 includes an analogue to digital converter for converting analogue audio signals into digital form. Once received (and where necessary digitized) the audio signals are processed by a processing unit, e.g., a central processing unit (CPU) 1403, which operates in conjunction with memory 1404. Memory 1404 includes software instructions 1405 which, among other functions, allow wireless speaker subsystem 1401 to perform methods described herein. It is noted that not all instructions required for performing these methods need be in memory 1404 at a given time.

Wireless speaker subsystem 1401, given that it presents the virtual interface for system 610, also becomes responsible for fetching media from a server, or in the case of an SPDIF stream, partially recovering that stream from a digital input. Data indicative of this media or stream is then distributed to the other devices in the group. CPU 1403 is responsible for administering playback of a received audio signal. In a broad sense, this includes two distinct tasks. Firstly, using a wireless network interface 1406, providing instructions to other wireless speaker subsystems to play respective components of the audio signal. Secondly, using an audio output 1407 (which in some embodiments includes one or more speaker cones), playing back the intended center wireless speaker subsystem component of the audio signal. There are, of course, detailed issues of rendering and synchronization, and these fall beyond the scope of the present disclosure.

Wireless speaker subsystem 1401 also includes an infrared port 1410. This infrared port receives infrared control signals from a compatible infrared remote controller 1411. Where wireless speaker subsystem 1401 acts as an individual wireless speaker subsystem, such a signal is a device control signal. However, when wireless speaker subsystem 1401 is part of a wireless audio system, such a signal is recognized as a system control signal. A system control signal received by infrared port 1410 is provided by a TCP message to the group. This is discussed further in by reference to FIG. 15 and FIG. 16.

In other embodiments alternate remote controls are used, such as Bluetooth remotes, 802.11 type networked remotes, and radio frequency remotes.

In other embodiments a control signal received by infrared port 1410 is provided to the group by means other than TCP message—for example by a layer two encapsulated message or other proprietary message.

Figure 15:
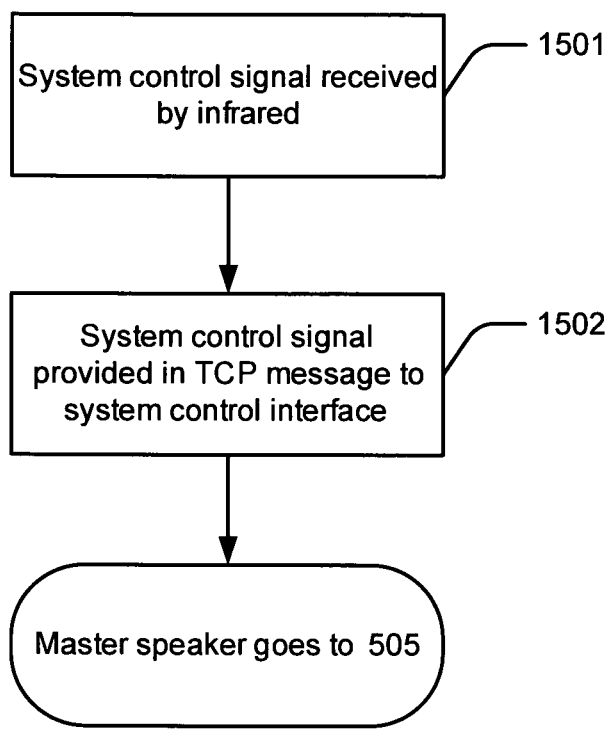
FIG. 15 shows a flowchart of an embodiment of a further method performed by a wireless speaker subsystem.

FIG. 15 shows a method for processing a system control signal received by infrared. This method is described by reference to the example of FIG. 6. The signal is received at step 1501, and provided in a TCP message to interface 609 of device 608 at step 1502. Device 608 then progresses to sub-process 505, and the relevant operational change is implemented across the system.

In overview, there are multiple one-way external interfaces that must propagate received commands to group 608. Because this is a unidirectional message, it is accomplished using a TCP connection from the wireless speaker subsystem receiving the infrared signal back to the group. Upon being received at the group, the received commands are aggregated to remove duplicate commands. Duplicates can occur because the same infrared command might be received concurrently at more than one infrared port. Obviously, though, only one action is desirable per button press on remote 1411. After aggregation then, the resulting single change in state is then distributed to all of the wireless speaker subsystems as discussed in relation to sub-process 505.

In one embodiment, messages provided at step 1502 are timestamped. In that embodiment, aggregating the received commands to remove duplicate commands includes analysis of these timestamps. In particular, when a command is received via infrared at step 1501, a timestamp is defined to identify the time at which the infrared command was received. The group, upon receipt of timestamped messages, compare the timestamps to determine whether received commands are unique or duplicates. In one embodiment the timestamp is a global timestamp derived from a global clock. In another embodiment the timestamp is derived from a device clock maintained by a particular wireless speaker subsystem, and all device clocks in the system are synchronised in accordance with a synchronisation protocol.

By this approach, a user can, by way of remote 1411, control system 610 by physically pointing the remote substantially in the direction of any of the wireless speaker subsystems and pressing one or more buttons enabled to cause operational changes.

Figure 16:
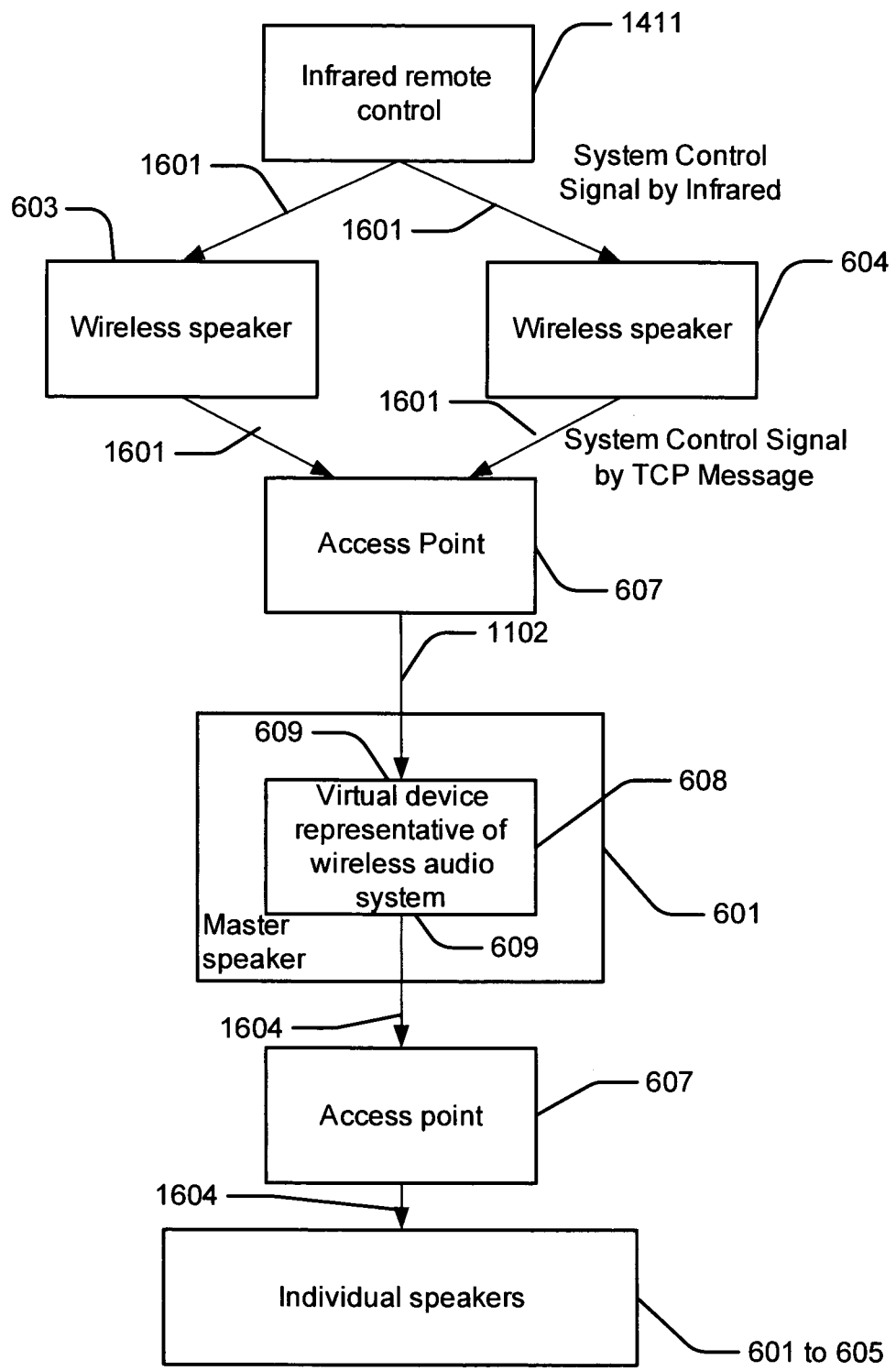
FIG. 16 schematically illustrates data flow in a wireless audio system embodiment.

FIG. 16 shows the data paths for infrared signals in a manner similar to the example of FIG. 11. In overview, remote 1411 provides a system control signal 1601, and this signal is received by to wireless speaker subsystems 603 and 604. These wireless speaker subsystems provide identical system control signals 1602 to device 608, and wireless speaker subsystems 601 to 605 subsequently receive corresponding device control signals 1604.

Similar infrared approaches are in some embodiments applied in situations where a group is not used. For example, where the leader wireless speaker subsystem advertises itself as a leader wireless speaker subsystem. In that case data indicative of the infrared signal is provided using a TCP connection from the wireless speaker subsystem receiving the infrared signal back to the leader wireless speaker subsystem.

Figure 17:
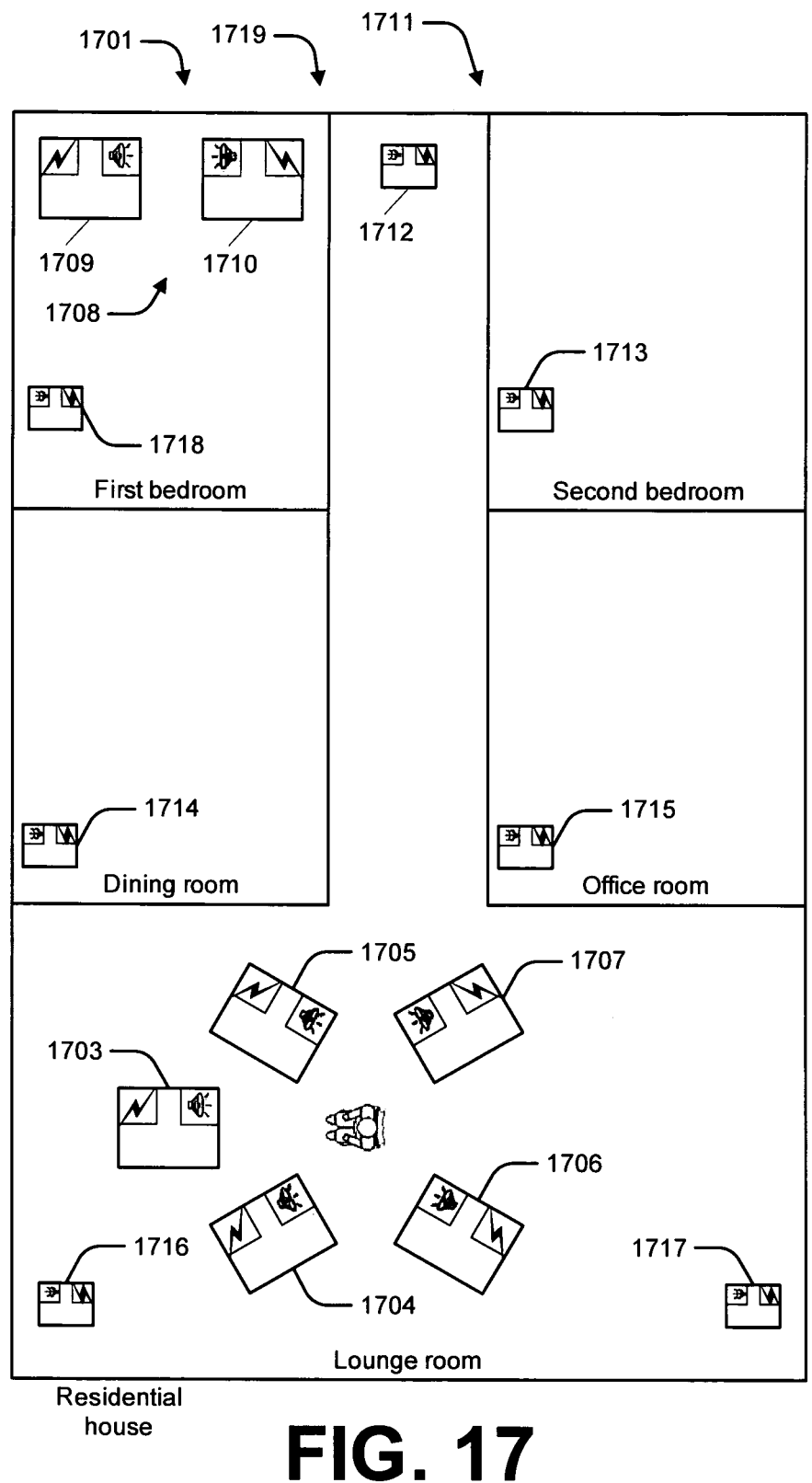
FIG. 17 is a plan view of a location having a plurality of wireless audio system embodiments.

In some embodiments multiple wireless audio systems are defined on a common network. For example, a building is split into areas where a different wireless audio system serves each area, although a single network serves all of the areas in combination. This is shown in the example of FIG. 17, which provides a plan view of a residential house 1701. There are three wireless audio systems defined:

Lounge DVD surround system 1702, including wireless speaker subsystems 1703 to 1707.
Bedroom stereo system 1708, including wireless speaker subsystems 1709 and 1710.
House ambiance system 1711, including wireless speaker subsystems 1712 to 1718.
House leader system 1719, including all of the above wireless speaker subsystems.

Where multiple systems exist on a common network, the groups representative of these systems determine which is to become the parent system (also referred to as the zone leader). This is largely dependent on the situation and the circumstances in which the systems were created. In some embodiments, one system is explicitly added to an existing system as a child system. In this case, system 1712 is the parent system and a group representing this system presents a system control interface for controlling all wireless speaker subsystems in the zone. This interface is used to apply an operational change across the whole zone—for example simultaneously muting all wireless speaker subsystems in the house. Each child system (systems 1702, 1708 and 1711) is represented by a respective group having its own control interface. To apply an operational change in a child system, a system control signal is provided to the group representative of that child system. To apply an operational change to the parent system, a system control signal is provided to the group representative of the parent system. In some embodiments the zones representative of all parent and child systems are provided by a common leader wireless speaker subsystem, regardless of whether that wireless speaker subsystem is included in each and every child system.

Although embodiments are described herein by reference to wireless speaker subsystems, it will be appreciated that in other embodiments other wireless media renderers are used. For example, wireless video units that receive over a wireless network data indicative of video and provide that video via a video output such as an LCD screen or an analogue or digital connection port.

Additionally, although the above embodiments have been described by reference to wireless networking, in some embodiments alternate networking arrangements are used such as wire-based Ethernet networks and power line networks. It will be appreciated that embodiments of the invention described by reference to wireless networking are equally applicable to these other networking arrangements.

It should be appreciated that although the invention has been described in the context of the IEEE 802.11 standard, the invention is not limited to such contexts and may be utilized in various other applications and systems, for example in other systems that use OFDM. OFDM is one example of a multicarrier system in which the signal for transmission is split into a set of subcarriers. The invention may also be applicable to other wireless receivers that use multicarriers.

In keeping with common industry terminology, the terms "base station", "access point", and "AP" may be used interchangeably herein to describe an electronic device that may communicate wirelessly and substantially simultaneously with multiple other electronic devices, while the terms "client," "mobile device" and "STA" may be used interchangeably to describe any of those multiple other electronic devices, which may have the capability to be moved and still communicate, though movement is not a requirement. However, the scope of the invention is not limited to devices that are labeled with those terms.

While an embodiment has been described for operation in an OFDM receiver with RF frequencies in the 5 GHz range and 2.4 GHz range (the 802.11a and 802.11g variants of the IEEE 802.11 standard), the invention may be embodied in receivers and transceivers operating in other RF frequency ranges. Furthermore, while a transceiver embodiment for operation conforming to the IEEE 802.11 OFDM standards has been described, the invention may be embodied in transceivers conforming to other standards and for other applications, including, for example other WLAN standards and other wireless standards. Applications that can be accommodated include IEEE 802.11a COFDM wireless LANs and links, wireless Ethernet, HIPERLAN 2, European Technical Standards Institute (ETSI) broadband radio access network (BRAN), and multimedia mobile access communication (MMAC) systems, wireless local area networks, local multipoint distribution service (LMDS) IF strips, wireless digital video, wireless USB links, wireless IEEE 1394 links, TDMA packet radios, low-cost point-to-point links, voice-over-IP portable "cell phones" (wireless Internet telephones), etc.

In the context of this document, the term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not.

Unless specifically stated otherwise, as apparent from the following discussions, it is appreciated that throughout the specification discussions utilizing terms such as "processing," "computing," "calculating," "determining" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable medium that carries computer-readable code (e.g., software) including a set of instructions to cause performing, when executed by one or more processors, one of more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable medium encoded with computer-executable code.

Furthermore, a computer-readable medium may form, or be includes in a computer program product.

In alternative embodiments, the one or more processors operate as a standalone device or may be connected, e.g., networked to other processor(s), in a networked deployment, the one or more processors may operate in the capacity of a server or a client machine in server-client network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagram(s) only show(s) a single processor and a single memory that carries the computer-readable code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer-readable medium encoded with a set of instructions, e.g., a computer program that are for execution on one or more processors, e.g., one or more processors that are part of a wireless speaker device or other wireless media rendering device. Thus, as will be appreciated by those skilled in the art, embodiments of the present invention may be embodied as a method, an apparatus such as a special purpose apparatus, an apparatus such as a data processing system, or a computer-readable medium, e.g., a computer program product. The computer-readable medium carries computer readable code including a set of instructions that when executed on one or more processors cause the processor or processors to implement a method. Accordingly, aspects of the present invention may take the form of a method, an entirely hardware embodiment, an entirely software embodiment or an embodiment combining software and hardware aspects. Furthermore, the present invention may take the form of computer-readable medium (e.g., a computer program product on a computer-readable storage medium) encoded with computer-readable program code embodied in the medium.

The software may further be transmitted or received over a network via a network interface device. While the computer-readable medium is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by one or more of the processors and that cause the one or more processors to perform any one or more of the methodologies of the present invention. A computer-readable medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "computer-readable medium" shall accordingly be taken to included, but not be limited to, solid-state memories, a computer product embodied in optical and magnetic media, a medium bearing a propagated signal detectable by at least one processor of one or more processors and representing a set of instructions that when executed implement a method, a carrier wave bearing a propagated signal detectable by at least one processor of the one or more processors and representing the set of instructions a propagated signal and representing the set of instructions, and a transmission medium in a network bearing a propagated signal detectable by at least one processor of the one or more processors and representing the set of instructions.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

"Variants of the IEEE 802.11 standard" as used herein means the variants and proposed variants of the IEEE 802.11 standard. Variants are versions defined in clauses of the standard and proposed amendments of the standard.

It should be appreciated that although the invention has been described in the context of variants of the IEEE 802.11 standard, the invention is not limited to such contexts and may be utilized in various wireless and non-wireless network applications and systems.

In one embodiment the SPDIF enabled device becomes the leader. In some embodiments, the group and the media source will not be implicitly linked together, so it may be possible for one device to have the SPDIF input and another to provide the streaming source from SPDIF.

A networked digital media device may be connected through any form of computer network including networks with wired and wireless physical layers and networks consisting of multiple physical layers. The network through which the digital media device is connected does not affect the operation of the group other than to partially vary the extent to which synchronous playback is possible.

While in most of the description above, a set of wireless speakers is used as an example of a networked digital media player, the invention is not limited to wireless speakers. Those in the art would readily be able to modify the description provided herein for wireless speakers and apply the methods and apparatuses to other discrete media devices. Thus while in one embodiments, some of the media devices include a radio interface and the network includes a wireless network, in general, the invention is applicable to media devices that can connect to a computer network. The description is provided in terms of wireless speakers in order to keep the description simple and not obscure the inventive concepts.

Furthermore, in most of the description above, a wireless audio system is used as an example of a networked digital media playback system—i.e., as an example of a system that allows one or more devices connected via a computer network to render digital media, the invention is not limited to a wireless audio system. Those of ordinary skill in the art would readily be able to modify the description provided for wireless audio systems herein and apply the methods and apparatuses to other digital media playback systems. The description is provided in terms of wireless speakers and a wireless audio system in order to keep the description simple and not obscure the inventive concepts.

All publications, patents, and patent applications cited herein are hereby incorporated by reference.

Any discussion of prior art in this specification should in no way be considered an admission that such prior art is widely known, is publicly known, or forms part of the general knowledge in the field.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

We claim:

1. A computer implemented method for configuring a set of networked media playback devices to provide multi-channel audio playback, the method including:
   (i) providing an interface that is configured to display a plurality of player icons, each player icon being indicative of a respective physical wireless speaker device;
   (ii) displaying, via the interface, a plurality of location icons, each location icon being indicative of a respective role in a multi-speaker arrangement, wherein each role is associated with a predefined audio channel for the multi-speaker arrangement;
   (iii) allowing a user to graphically manipulate the player icons; and
   (iv) being responsive to graphical manipulation of a selected one of the player icons to a selected one of the location icons for providing an instruction to configure a wireless speaker device of which the selected player icon is indicative to adopt the role in a multi-speaker arrangement of which the selected location icon is indicative;
   such that in response to an instruction to playback a multi-channel audio source via the multi-speaker arrangement, each wireless speaker device plays back the predefined audio channel for its adopted role.

2. A method according to claim 1 wherein the multi-speaker arrangement is a multi-channel surround sound arrangement.

3. A method according to claim 1 including the step of being responsive to a user command in respect of one of the player icons for instructing a wireless speaker device of which that icon is indicative to playback an audible test signal, thereby to enable the user to physically identify the speaker device of which that icon is indicative.

4. A method according to claim 1 wherein the interface is configured such that the location icons are arranged thereby to provide a spatial graphical representation of the multi-speaker arrangement.

5. A method according to claim 1 wherein the interface displays the location icons in a plan-view representation of the multi-speaker arrangement.

6. A computer implemented method for enabling a user to configure a surround sound system using wireless speaker units, the method including:
   providing a graphical plan view of speaker locations in the surround sound arrangement, wherein each speaker location is associated with a respective surround sound audio playback channel;
   enabling a user to associate each speaker location with a respective wireless speaker unit;
   in response to the association of a given speaker location with a given wireless speaker unit, providing a configuration instruction such that, for subsequent playback of multi-channel audio data via the surround sound system, the given wireless speaker unit is configured to play back the respective surround sound audio playback channel associated with the given speaker location.

7. A computer implemented method according to claim 6 wherein the interface enables a user to drag and drop an icon indicative of a selected speaker unit to a desired speaker location thereby to associate that speaker unit with that speaker location.

8. A computer implemented method according to claim 6 including enabling a user to initiate an audible test signal via a selected one of the wireless speaker units, thereby to facilitate physical identification of that wireless speaker unit.

\* \* \* \* \*